United States Patent [19]
Nakamura et al.

[11] Patent Number: 5,629,483
[45] Date of Patent: May 13, 1997

[54] PIEZOELECTRIC VIBRATOR AND ACCELERATION SENSOR USING THE SAME

[75] Inventors: Takeshi Nakamura; Takayuki Kaneko, both of Nagaokakyo, Japan

[73] Assignee: Murata Manufacturing Co., Kyoto-fu, Japan

[21] Appl. No.: 521,421

[22] Filed: Aug. 30, 1995

Related U.S. Application Data

[62] Division of Ser. No. 202,017, Feb. 25, 1994.

[30] Foreign Application Priority Data

| Mar. 1, 1993 | [JP] | Japan | 5-066231 |
| Mar. 1, 1993 | [JP] | Japan | 5-066233 |
| Mar. 19, 1993 | [JP] | Japan | 5-085712 |
| Apr. 26, 1993 | [JP] | Japan | 5-123421 |
| Apr. 26, 1993 | [JP] | Japan | 5-123422 |
| Apr. 28, 1993 | [JP] | Japan | 5-125485 |

[51] Int. Cl.$^6$ ............................................. G01P 15/09
[52] U.S. Cl. ............................. 73/514.34; 310/321
[58] Field of Search ...................... 310/321; 73/DIG. 4, 73/504.04, 504.12, 514.13, 514.16, 514.29, 514.34, 514.35, 514.38

[56] References Cited

U.S. PATENT DOCUMENTS 4,281,298 7/1981 Gounju ............................... 310/321
4,633,204 12/1986 Gounji et al. .

FOREIGN PATENT DOCUMENTS

| 2328807 | 1/1975 | Germany . | |
| 249874 | 9/1994 | Japan | 73/514.34 |
| 249873 | 9/1994 | Japan | 73/514.34 |
| 06289046 | 10/1994 | Japan | 73/214.29 |

*Primary Examiner*—Hezron E. Williams
*Assistant Examiner*—Christine K. Oda
*Attorney, Agent, or Firm*—Nikaido Marmelstein Murray & Oram LLP

[57] ABSTRACT

Four piezoelecric elements are formed on both surfaces of a plate-shaped vibrating body. Two piezoelectric elements are formed to be opposite to each other at one side of the longitudinal center portion of the vibrating body. Another two piezoelectric elements are formed to be opposite to each other at the other side of the longitudinal center portion of the vibrating body. By applying a signal to the piezoelectric elements, the vibrating body is vibrated in a longitudinal direction. In this time, the vibrating body is vibrated in such a manner that longitudinal expansion and contraction take place simultaneously in a part of the vibrating body. By using such vibration, both longitudinal ends are not displaced in spite of the vibration of the vibrating body. The vibrating body can be used as an acceleration sensor by measuring the output voltages from the piezoelectric elements of the vibrating body.

7 Claims, 21 Drawing Sheets

FIG.48
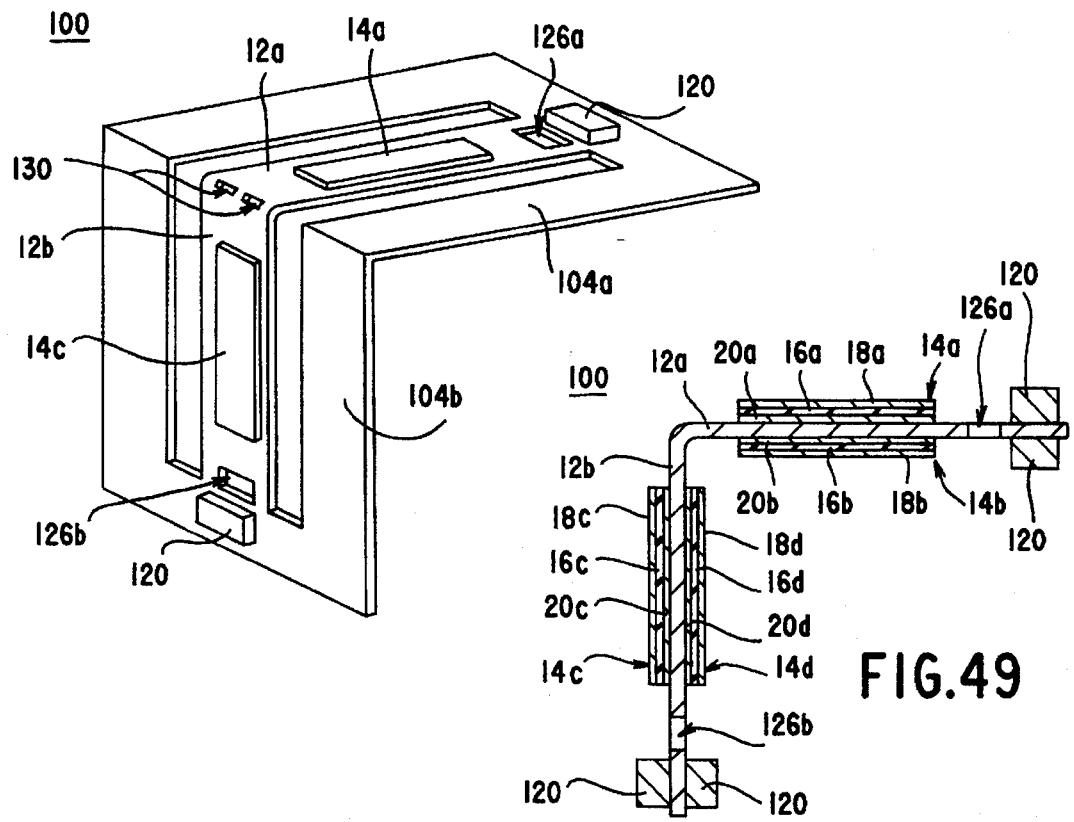
FIG.49
FIG.50
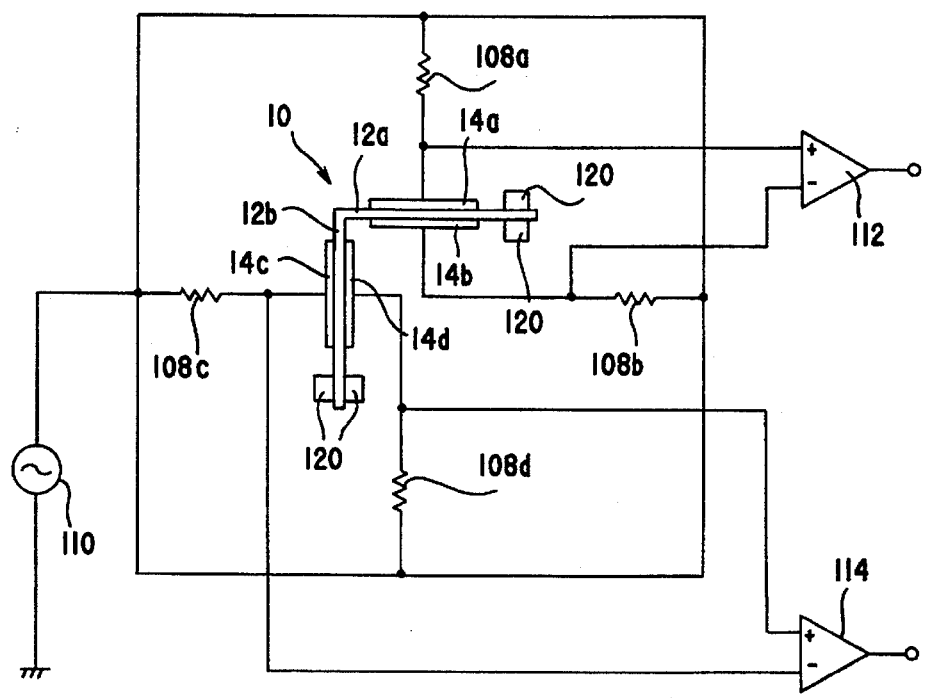

PIEZOELECTRIC VIBRATOR AND ACCELERATION SENSOR USING THE SAME

This is a divisional, of application Ser. No. 08,202,017 filed Feb. 25, 1994, pending.

BACKGROUND OF THE INVENTION

1. Field of the Invention

The present invention relates to a piezoelectric vibrator and an acceleration sensor, particularly, relates to a piezoelectric vibrator used for oscillator, filter and sensor, and relates to an acceleration sensor using the piezoelectric vibrator.

2. Description of the Prior Art

As a piezoelectric vibrator using the piezoelectric effect, there is the piezoelectric vibrator which a piezoelectric element is formed on a surface of a vibrating body formed of constant elastic metal material and the like. As a vibrating mode of such piezoelectric vibrator, there are bending vibrating mode, thickness vibrating mode, twisting vibrating mode and longitudinal vibrating mode and the like. The piezoelectric vibrator is used for an oscillator, filter and sensor and the like.

In the conventional piezoelectric vibrator, it becomes difficult to support the piezoelectric vibrator due to the miniaturization. Vibration tends to leak through supporting portion of the piezoelectric vibrator, and the characteristics of the piezoelectric vibrator is deteriorated due to the vibration leakage. When some displacement or deformation occurs to the supporting portions of the piezoelectric vibrator by an external force, the characteristics of the piezoelectric vibrator varies largely.

FIG. 57 is an illustrative view showing an example of a conventional acceleration sensor. The acceleration sensor 1 includes a plate 2. One end of the plate 2 is fixed, and a weight 3 is attached to the other end of the plate 2. A piezoelectric elements 4 are formed on both surfaces of the plate 2. When an acceleration is applied in a direction perpendicular to the surface of the plate 2 of the acceleration sensor 1, the plate 2 bends as shown in FIG. 58. A voltage corresponding to the bending of plate 2 is generated in the piezoelectric elements 4. By measuring the voltage correspoonding to the bending of plate 2, the acceleration can be detected. The bending of the plate 2 can be increased by attaching the weight 3, and resulting in improvement of the sensitivity of the acceleration sensor 1.

When such an acceleration sensor is mounted on a car, the impact or the vibration due to unevenness of the road is often stronger than the acceleration of the car. Hence, such an acceleration sensor of cantilever-construction type is apt to cause misoperation or damage due to influence of impact attributable to unevenness of the road surface.

It is necessary to use a plurality of acceleration sensors in order to detect accelerations in a plurality of directions.

SUMMARY OF THE INVENTION

It is, therefore, a primary object of the present invention to provide a piezoelectric vibrator which is easy to hold, has reduced vibration leakage and is less influenced by an external force.

It is the primary object of the present invention to provide an acceleration sensor which can detect a minute acceleration with a high sensitivity and has a high impact resistance by using the above piezoelectric vibrator.

It is the another object of the present invention to provide an acceleration sensor capable of detecting accelerations in a plurality of directions.

The present invention is directed to a piezoelectric vibrator comprising a vibrating body, and piezoelectric elements formed on the vibrating body, wherein the vibrating body vibrates by using the piezoelectric effect of the piezoelectric elements, and the vibrating body vibrates in such a manner that expansion and contraction take place simultaneously in a part of the vibrating body. The present invention is directed to a piezoelectric vibrator comprising a vibrating body made of piezoelectric material, and electrodes formed on the vibrating body, wherein the vibrating body vibrates by using the piezoelectric effect of the vibrating body, and the vibrating body vibrates in such a manner that expansion and contraction take place simultaneously in a part of the vibrating body.

In the above piezoelectric vibrator, it is desirable that the overall length in a vibrating direction of the vibrating body is almost constant. Due to the vibration of the vibrating body in such a manner that expansion and contraction take place simultaneously in a part of the vibrating body, the piezoelectric vibrator whose overall length is almost constant can be obtained in spite of vibration of the vibrating body. According to the present invention, the piezoelectric vibrator can be used in the same manner as the conventional vibrator by using the vibration of the vibrating body. Since the overall size of the vibrating body is almost constant, the vibrating body can be easily supported at the portion where has no displacment by the vibration occurs, and vibration leakage can therefore be largely reduced. When the vibrating body is supported there is no displacement, there are less influences on vibration due to an external force and the like, and the piezoelectric vibrator having stabilized characteristics can be obtained. The present invention is directed to an acceleration sensor comprising a plate-shaped vibrating body, opposed piezoelectric elements formed on both surfaces of the vibrating body, a weight formed at the center of the vibrating body, and a supporting means for supporting both ends of the vibrating body, wherein the vibrating body vibrates in such a manner that longitudinal expansion and contraction take place inversely at both sides of the center portion of the vibrating body by applying a driving signal to the piezoelectric elements.

The present invention is directed to an acceleration sensor comprising a plate-shaped vibrating body made of piezoelectric material, opposed electrodes formed on both surfaces of the vibrating body, a weight formed at the center of the vibrating body, and a supporting means for supporting both ends of the vibrating body, wherein the vibrating body vibrates in such a manner that longitudinal expansion and contraction take place inversely at both sides of the center portion of the vibrating body by applying a driving signal to the electrodes.

Since opposed piezoelectric elements are formed on both surfaces of the vibrating body, the vibrating body can be vibrated longitudinally, and an inertia is applied to the vibrating body and the weight. When acceleration is given to the vibrating body perpendicular to its surface under such conditions, the vibrating body is bent. By placing the weight at the center of the vibrating body, the bending of the vibrating body due to the acceleration is increased. Since both ends of the vibrating body are supported, impact resistance is increased. Since the vibrating body vibrates in such a manner that longitudinal expansion and contraction take place at both sides of the center portion of the vibrating body, displacement is mutually offset, and results in less vibration leakage to the supporting means.

According to the present invention, the vibrating body bends largely even when a minute acceleration is applied to the acceleration sensor. Hence, the voltage generated in the piezoelectric element is increased, and the detection sensitivity can be improved. Since the acceleration sensor has a structure of supporting both ends of the vibrating body, the acceleration sensor has a high impact resistance, and is safe from damage due to unevenness of the road even when it is mounted on a car. Since the vibration leakage of the vibrating body is small, stabilized vibration can be obtained, and results in an improved stabilization of its characteristics.

The present invention is directed to an acceleration sensor comprising a plate-shaped vibrating body, opposed piezoelectric elements formed on both surfaces of the vibrating body, and weights formed at both longitudinal ends of the vibrating body, wherein the vibrating body vibrates in such a manner that longitudinal expansion and contraction take place inversely at both sides of the center portion of the vibrating body by applying a driving signal to the piezoelectric elements.

The present invention is directed to an acceleration sensor comprising a plate-shaped vibrating body made of piezoelectric material, opposed electrodes formed on both surfaces of the vibrating body, and weights formed at both longitudinal ends of the vibrating body, wherein the vibrating body vibrates in such a manner that longitudinal expansion and contraction take place inversely at both sides of the center portion of the vibrating body by applying a driving signal to the electrodes.

In the acceleration sensor, a frame for supporting both longitudinal ends of the vibrating body may be formed.

By applying a signal to the piezoelectric elements formed on the surfaces of the vibrating body, it is possible to vibrate the vibrating body in a longitudinal direction, and inertia is applied to the vibrating body. When acceleration is applied to the vibrating body perpendicular to its surface under such a condition, the vibrating body is bent. Since the weights are formed at both longitudinal ends of the vibrating body, the bending of the vibrating body is increased. Since both ends of the vibrating body are supported with the frame, impact resistance is increased. Since the vibrating body vibrates in such a manner that longitudinal expansion and contraction take place inversely at both sides of the center portion of the vibrating body, displacement is mutually offset, and results in less vibration leakage to the frame.

According to the present invention, the vibrating body bends largely even when a minute acceleration is applied to the acceleration sensor. Hence, the voltage generated in the piezoelectric element is increased, and the detection sensitivity can be improved. Since the acceleration sensor has a structure of supporting both ends of the vibrating body by the frame, the acceleration sensor has a high impact resistance, and is safe from damage due to unevenness of the road even when it is mounted on a car. Since the vibration leakage of the vibrating body is small, stabilized vibration can be obtained, and resulting in a improved stabilization of its characteristics.

The present invention is directed to an acceleration sensor comprising a prism-shaped vibrating body, and a plurality of piezoelectric elements arranged peripherally on the side faces of the vibrating body, wherein the vibrating body vibrates in such a manner that longitudinal expansion and contraction take place inversely at both sides of the center portion of the vibrating body by applying a driving signal to the piezoelectric elements.

The present invention is directed to an acceleration sensor comprising a prism-shaped vibrating body made of piezoelectric material, and a plurality of electrodes arranged peripherally on side faces of the vibrating body, wherein the vibrating body vibrates in such a manner that longitudinal expansion and contraction take place inversely at both sides of the center portion of the vibrating body by applying a driving signal to the electrodes.

By applying a driving signal to the piezoelectric elements or electrodes formed on the side faces of the vibrating body, it is possible to vibrate the vibrating body in a longitudinal direction, and inertia is applied to the vibrating body. When acceleration is applied to the acceleration sensor perpendicular to its side face under such a condition, the vibrating body is bent. Corresponding to bending of the vibrating body, a voltage is generated in the piezoelectric elements. Since the piezoelectric elements are formed peripherally in a plurality of positions on the side faces of the vibrating body, voltage is generated in each piezoelectric element corresponding to the acceleration component in the direction perpendicular to the surface of each piezoelectric element.

According to the present invention, since voltage is generated in each piezoelectric element corresponding to the acceleration component in the direction perpendicular to the surface of each piezoelectric element, it is possible to detect the acceleration in every direction perpendicular to the central axis of the vibrating body.

The present invention is directed to an acceleration sensor comprising a plurality of plate-shaped vibrating bodies connected with each other so that the surfaces of the vibrating bodies are crossed on one central axis, and piezoelectric elements are formed on surfaces of a plurality of vibrating bodies, wherein the vibrating bodies connected with each other vibrate in such a manner that longitudinal expansion and contraction take place inversely at both sides of the center portion of the vibrating bodies by applying a driving signal to the piezoelectric elements.

The present invention is directed to an acceleration sensor comprising a plurality of plate-shaped vibrating bodies made of piezoelectric material connected with each other so that the surfaces of the vibrating bodies are crossed on one central axis, and electrodes formed on surfaces of a plurality of vibrating bodies, wherein the vibrating bodies connected with each other vibrate in such a manner that longitudinal expansion and contraction take place inversely at both sides of the center portion of the vibrating bodies by applying a driving signal to the electrodes.

By applying a driving signal to the piezoelectric elements or electrodes formed on surfaces on a plurality of vibrating bodies, it is possible to vibrate the vibrating bodies in a longitudinal direction, and inertia is applied to the vibrating bodies. When acceleration is given to the acceleration sensor in the direction perpendicular to the central axis of the vibrating bodies under such a condition, the vibrating bodies are bent. Since the vibrating bodies are formed in a plate-shape, large bending of the vibrating bodies can be obtained as compared with the prism-shaped vibrating body. The piezoelectric elements or the electrodes are formed on the surfaces of the plate-shaped vibrating bodies, and the surfaces of the vibrating bodies are crossed on one central axis with each other. Therefore, voltage corresponding to the acceleration component perpendicular to the surface of each vibrating body is generated in each piezoelectric element or vibrating body formed of piezoelectric material.

According to the present invention, since voltage can be obtained from every piezoelectric element corresponding to the acceleration component perpendicular to the surface of each vibrating body, it is possible to detect the acceleration in every direction perpendicular to the central axis of the vibrating body. Since each vibrating body is formed in a plate-shape, large bending corresponding to acceleration can be obtained, and results in large output voltage. Therefore, large output voltage can be obtained even when a minute acceleration is given to the acceleration sensor, and the acceleration sensor having high detecting sensitivity can be obtained.

The present invention is directed to an acceleration sensor comprising a plurality of plate-shaped vibrating bodies connected in a folded manner, and piezoelectric elements are formed on surfaces of the vibrating bodies, wherein the vibrating bodies vibrate in such a manner that longitudinal expansion and contraction take place inversely at both sides of the folding portion of the vibrating bodies by applying a driving signal to the piezoelectric elements.

The present invention is directed to an acceleration sensor comprising a plurality of plate-shaped vibrating bodies made of piezoelectric material connected in a folded manner, and electrodes are formed on surfaces of the vibrating bodies, wherein the vibrating bodies vibrate in such a manner that longitudinal expansion and contraction take place inversely at both sides of the folding portion of the vibrating bodies by applying a driving signal to the electrodes.

By applying a driving signal to the piezoelectric elements or the electrodes formed on the surfaces of the vibrating bodies, it is possible to vibrate the vibrating body in a longitudinal direction, and inertia is given to the vibrating bodies. When acceleration is given to the acceleration sensor in the direction perpendicular to the central axis of either vibrating body under such conditions, the vibrating body bends. Since the vibrating body is formed in a plate-shape, large bending of the vibrating body can be obtained as compared with the prism-shaped vibrating body. The piezoelectric elements or electrodes are formed on the surfaces of the plate-shaped vibrating bodies, and the vibrating bodies are connected in a folded manner. Hence, voltage corresponding to the acceleration component perpendicular to each vibrating body is generated in the piezoelectric element or vibrating body formed of piezoelectric material.

According to the present invention, since voltage can be obtained from each piezoelectric element or electrode corresponding to the acceleration component perpendicular to the surface of each vibrating body, it is possible to detect the acceleration component in each direction perpendicular to the surface of the vibrating body. Since each vibrating body is formed in a plate-shape, large bending corresponding to acceleration can be obtained, and results in a large output voltage. Therefore, large output voltage can be obtained even when a minute acceleration is given to the acceleration sensor, and the acceleration sensor having high detecting sensitivity can be obtained.

The above and further objects, features, aspects and advantages of the invention will be more fully apparent from the following detailed description with the accompanying drawings.

BRIEF DESCRIPTION OF THE DRAWINGS

FIG. 48 is a perspective view showing a fourteenth embodiment of an acceleration sensor of the invention.

FIG. 49 is a sectional view showing an acceleration sensor shown in FIG. 48.

FIG. 50 is a circuit diagram showing a circuit for an acceleration sensor shown in FIG. 48 when it is used.

DESCRIPTION OF THE PREFERRED EMBODIMENTS

Figure 1:
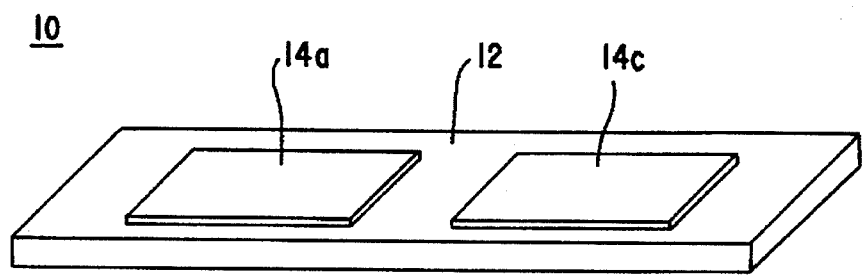
FIG. 1 is a perspective view showing an embodiment of the piezoelectric vibrator of the invention.
Figure 2:
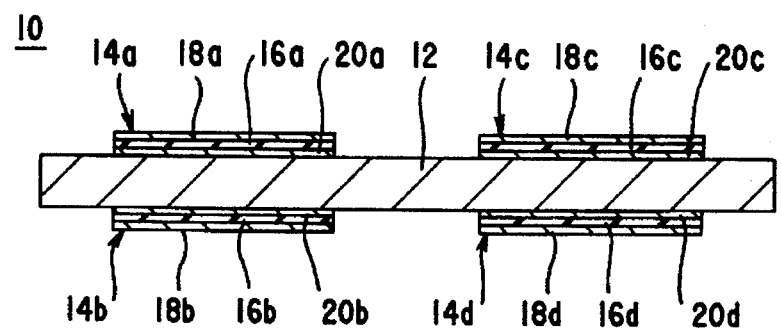
FIG. 2 is a sectional view showing a piezoelectric vibrator shown in FIG. 1.

FIG. 1 is a perspective view showing an embodiment of the present invention, and FIG. 2 is a sectional view thereof. A piezoelectric vibrator 10 comprises a plate-shaped vibrating body 12. The vibrating body 12 is made of, for example, a constant elastic material such as elinvar, iron-nickel alloy, quartz, glass, crystal and ceramics. The vibrating body 12 is supported at both ends.

Piezoelectric elements 14a, 14b, 14c and 14d are formed on opposite surfaces of the vibrating body 12. The piezoelectric elements 14a and 14b are formed on opposite surfaces of the vibrating body 12 at one side portion adjacent the longitudinal center portion of the vibrating body 12. The piezoelectric elements 14c and 14d are formed on opposite surfaces of the vibrating body 12 at the other side portion adjacent the longitudinal center portion of the vibrating body 12 . The piezoelectric element 14a includes a piezoelectric plate 16a made of, for example, piezoelectric ceramics . Electrodes 18a and 20a are formed on both surfaces of the piezoelectric plate 16a. One electrode 20a of the piezoelectric element 14a is bonded to the vibrating body 12. Similarly, the piezoelectric elements 14b, 14c and 14d include piezoelectric plates 16b, 16c and 16d. On both surfaces of the piezoelectric plates 16b, 16c and 16d, electrodes 18b, 20b, electrodes 18c, 20c and electrodes 18d, 20d are formed. The electrodes 20b, 20c, 20d of the piezoelectric elements 14b, 14c, 14d are bonded to the vibrating body 12. In this embodiment, the piezoelectric plates 16a and 16b are polarized from outside toward the vibrating body 12 side, and piezoelectric plates 16c and 16d are polarized from the vibrating plate 12 side toward outside.

Figure 3:
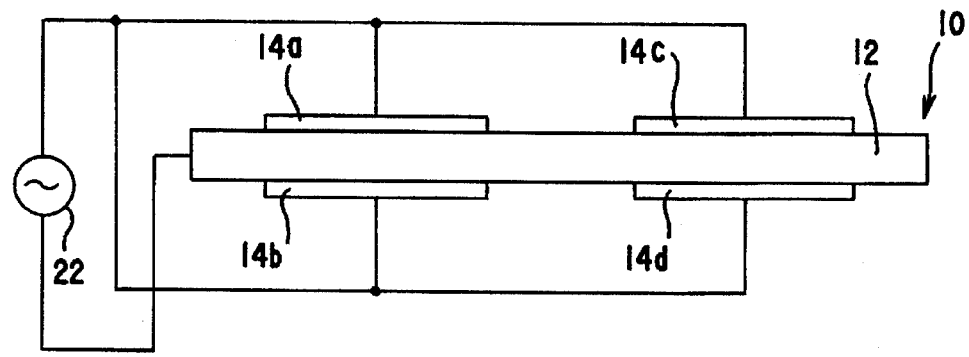
FIG. 3 is a circuit diagram for driving a piezoelectric vibrator shown in FIG. 1.
Figure 4A:
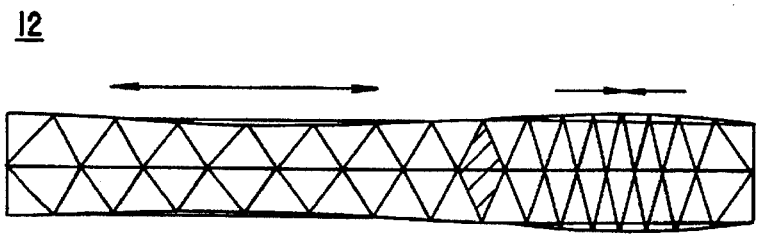
FIGS. 4(A)-4(E) are illustrative views showing a vibrating state of the piezoelectric vibrator shown in FIG. 1.
Figure 4B:
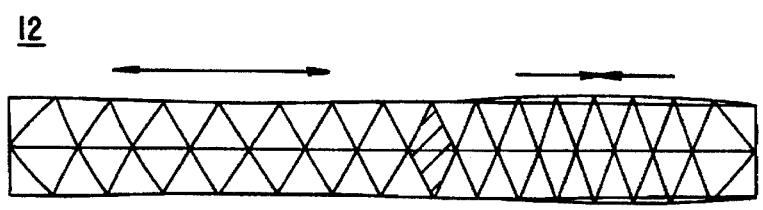
Figure 4C:
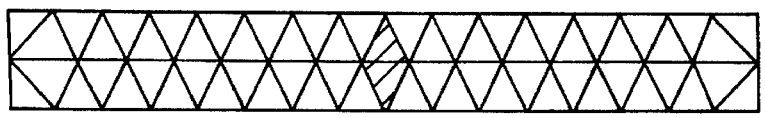
Figure 4D:
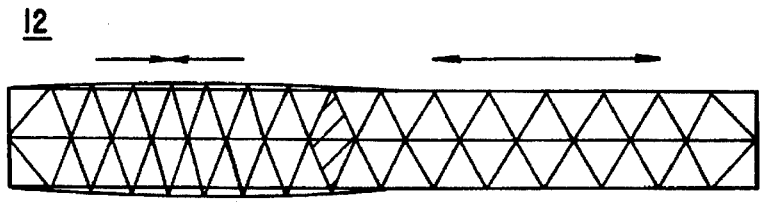
Figure 4E:
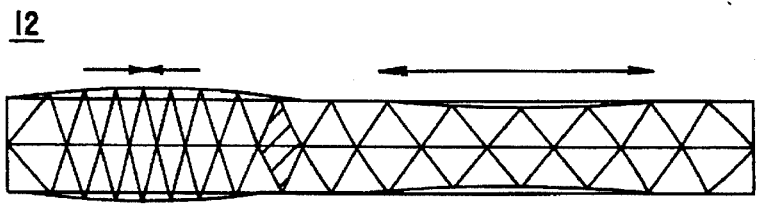

For vibrating the piezoelectric vibrator 10, an oscillation circuit 22 is connected to the piezoelectric elements 14a–14d as shown in FIG. 3. Driving signals having the same phase are applied to the piezoelectric elements 14a–14d from the oscillation circuit 22. The piezoelectric elements 14a and 14b are formed to be opposite to each other with the vibrating body 12 between them, and the piezoelectric elements 14c and 14d are formed to be opposite to each other with the vibrating body 12 between them. Hence, when driving signals are applied to the piezoelectric elements 14a–14d, the vibrating body 12 vibrates in a longitudinal direction. Since the piezoelectric elements 14a, 14b and piezoelectric elements 14c, 14d are polarized in the inverse situation, as shown in FIG. 4(A)–FIG. 4(E), when one side of the vibrating body 12 adjacent the longitudinal center portion expands, the other side of the vibrating body 12 contracts. When one side of the vibrating body 12 adjacent the longitudinal center portion contracts, the other side of the vibrating body 12 expands. Therefore, even when the vibrating body 12 is vibrating, both end portions of the vibrating body 12 are not displaced. When the length of the vibrating body 12 is taken as L, its density is taken as P, and the Young's modulus is taken as E, the resonance frequency f is represented by the following formula.

$$f = \frac{1}{2L} \sqrt{\frac{E}{\rho}}$$

Figure 5:
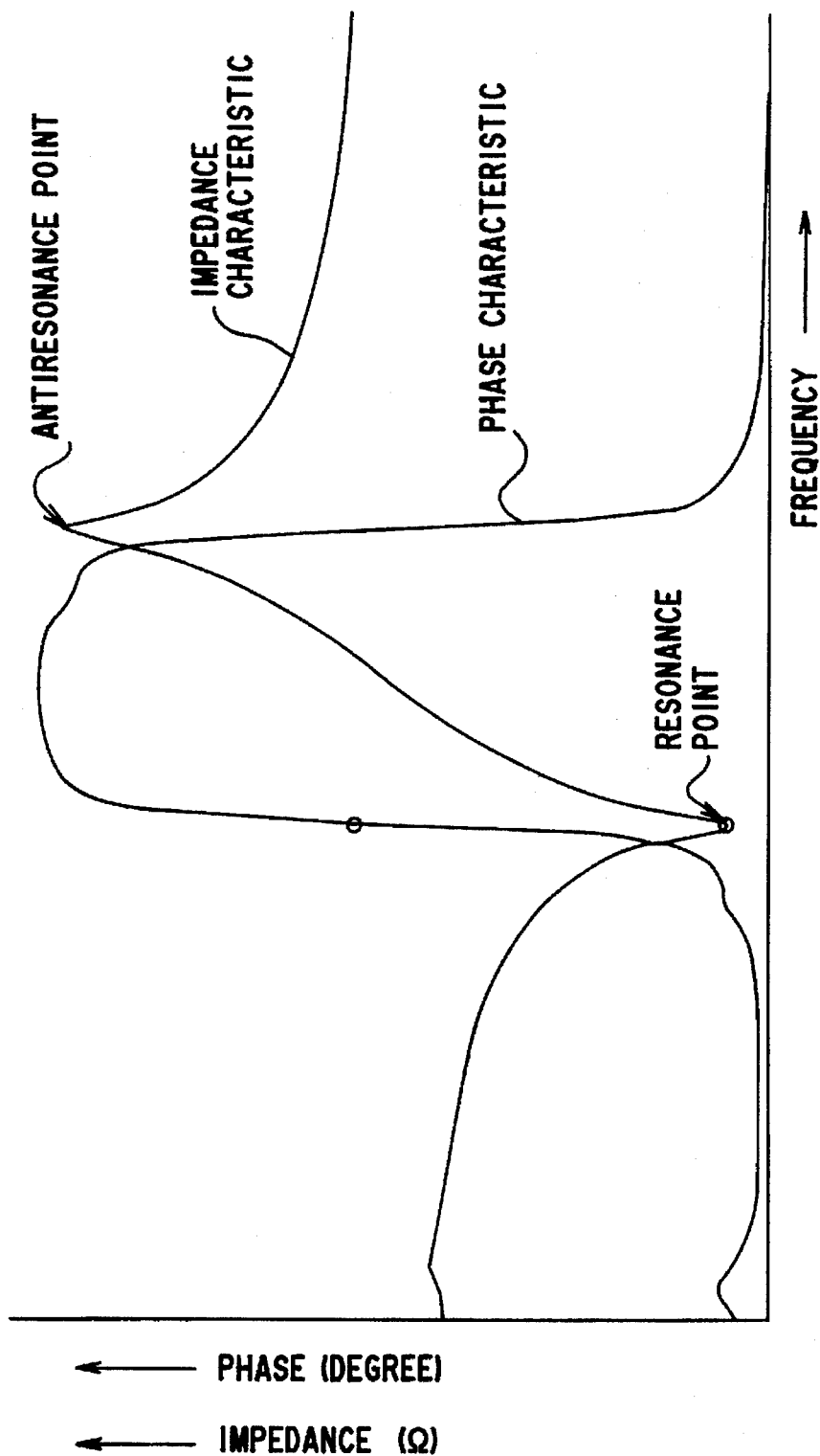
FIG. 5 is a graph showing a resonance characteristics of the piezoelectric vibrator shown in FIG. 1.

The frequency characteristics of phase and impedance of piezoelectric vibrator 10 are shown in FIG. 5. As shown from FIG. 5, the piezoelectric vibrator 10 has fine resonance characteristics, and is well usable as an resonator. Even when the vibrating body 12 is vibrating, the displacement of the both end portions of vibrating body 12 is offset since the expanding portion and the contracting portion exist in the vibrating body 12. Hence, the overall length of the vibrating body 12 is almost constant, and the vibration leakage from the supporting portion is reduced by supporting the vibrating body 12 at both ends. Even if an external force is applied to the supporting portions, there is less influences on the vibration of the vibrating body 12 since the supporting portions have no displacement.

As shown from the above formula, in the piezoelectric vibrator 10, the resonance frequency is adjustable by adjusting the overall length of the vibrating body 12. For example, when both ends of the vibrating body 12 is cut to make the overall length of the vibrating body 12 smaller, it is possible to increase the resonance frequency. As shown from FIG. 6, if any groove 30 extending laterally is formed at the central portion of the vibrating body 12, it is possible to increase the surface length of the vibrating body 12 and decrease the resonance frequency.

In the above embodiment, the piezoelectric elements 14a, 14b and the piezoelectric elements 14c, 14d are polarized in the inverse situation, it is possible to polarize all piezoelectric elements 14a–14d in the same situation. That is, the piezoelectric elements 14a–14d may be polarized from the outside surface toward the vibrating body 12 side, and the piezoelectric elements 14a–14d may be polarized from the vibrating body 12 side toward the outside surface. In this case, by applying driving signals having inverse phases to the piezoelectric elements 14a, 14b and the piezoelectric elements 14c, 14d, it is possible to vibrate the vibrating body 12 in such a manner that longitudinal expansion and contraction take place inversely on both sides of the center portion of the vibrating body 12.

Figure 7:
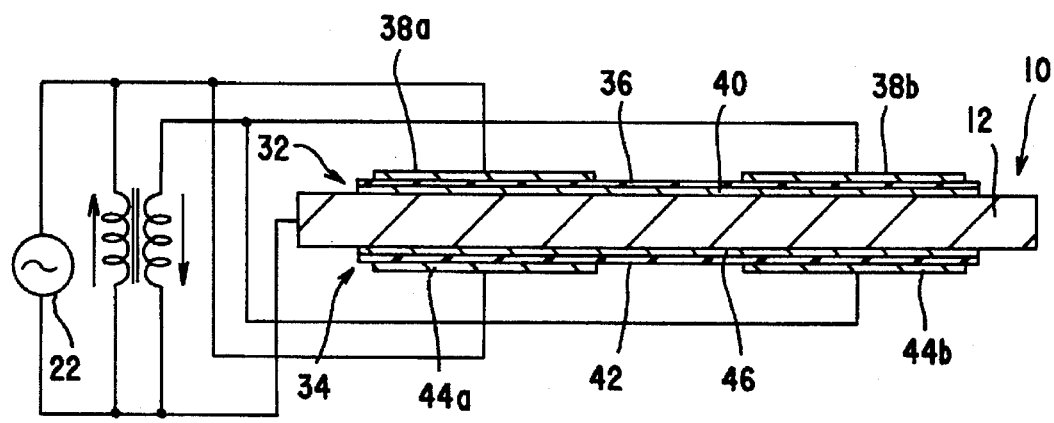
FIG. 7 is an illustrative view showing a modified example of the piezoelectric vibrator shown in FIG. 1 and the circuit for driving it.

As shown in FIG. 7, two piezoelectric elements 32 and 34 may be formed on both surfaces of the vibrating body 12. The piezoelectric element 32 includes a piezoelectric plate 36. Two electrodes 38a and 38b are formed on one surface of the piezoelectric plate 36, and an electrode 40 is formed on the entire other surface of the piezoelectric plate 36. The electrode 40 is bonded to the vibrating body 12. Similarly, the piezoelectric element 34 includes a piezoelectric plate 42, and electrodes 44a, 44b and an electrode 46 are formed on both surfaces of the piezoelectric plate 42. The electrode 46 is bonded to the vibrating body 12. In the piezoelectric elements 32 and 34, the piezoelectric plates 36 and 42 are polarized, for example, from the outside surface toward the vibrating body 12 side. The driving signals are inverted in polarity in a circuit of FIG. 7, and the driving signals applied to the electrodes 38a, 44a and the driving signals applied to the electrodes 38b, 44b have inverse phase. Needless to say, when such a circuit is used, the piezoelectric plates 36 and 42 may be polarized from the the vibrating body 12 side the toward outside surface. In the piezoelectric vibrator 10 shown in the above embodiments, it is not always necessary to support the vibrating body 12 at both ends, and, for example, the vibrating body 12 may be supported at the inward portions approximately ¼ from both ends. There is no displacement at this point, and it is possible to prevent vibration leakage from the supporting portions.

Figure 8:
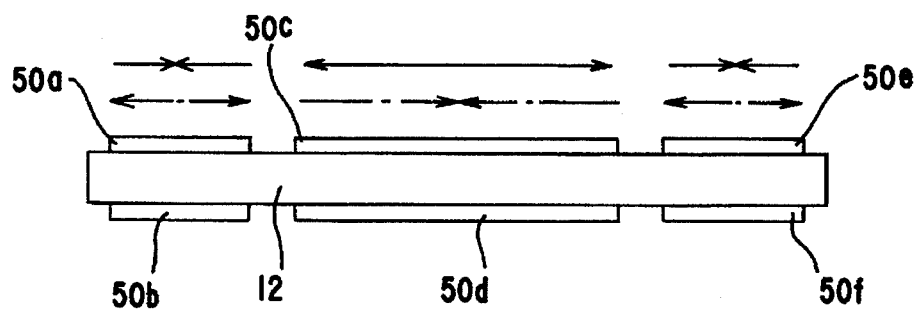
FIG. 8 is an illustrative view showing another embodiment of a piezoelectric vibrator of the invention.

The number of piezoelectric elements is not necessarily four and, as shown in FIG. 8, six piezoelectric elements 50a, 50b, 50c, 50d, 50e and 50f may be formed. The piezoelectric elements 50c and 50d are formed to be opposite to each other at the center portion of the vibrating body 12, and the piezoelectric elements 50a, 50b and the piezoelectric elements 50e, 50f are formed to be opposite to each other at both side portions of the piezoelectric elements 50c, 50d. The length of the piezoelectric elements 50c, 50d is adjusted to be approximately twice the length of the piezoelectric elements 50a, 50b, 50e, 50f in the vibrating direction. In the piezoelectric vibrator 10, the piezoelectric elements 50a, 50b, 50e, 50f are polarized from the outside surface toward the vibrating body 12 side, and the piezoelectric elements 50c, 50d are polarized from the vibrating body 12 side toward the outside surface. Needless to say, the polarizing direction of the piezoelectric elements 50a–50f may be the inverse situation.

Figure 9:
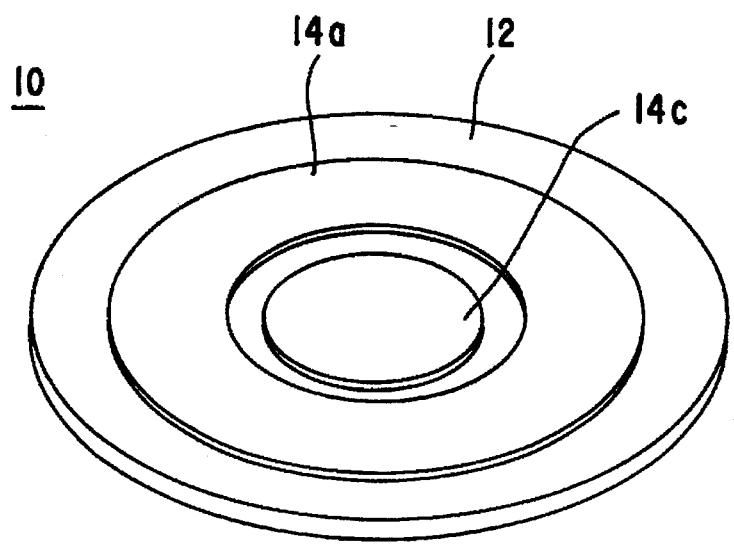
FIG. 9 is a perspective view showing still another embodiment of a piezoelectric vibrator of the invention.
Figure 10:
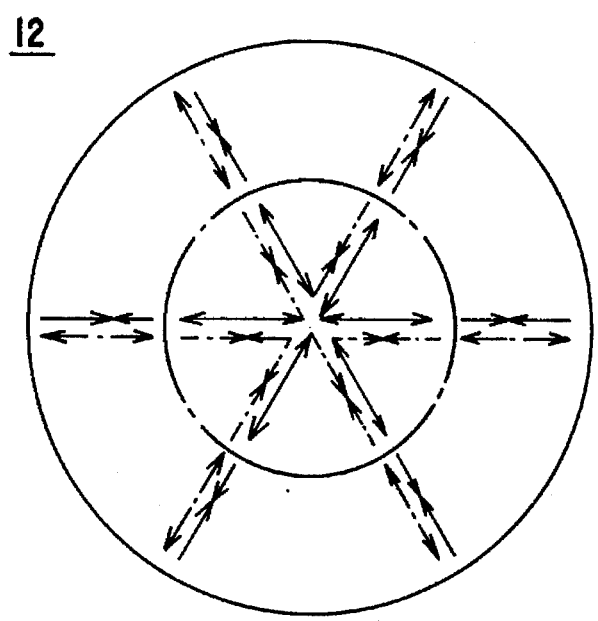
FIG. 10 is an illustrative view showing a vibrating state of the piezoelectric vibrator shown in FIG. 9.

When driving signals having the same phase are applied to the piezoelectric elements 50a–50f, the vibrating body 12 vibrates in such a manner that longitudinal expansion and contraction take place inversely at both portions of approximately ¼ from both ends as shown with arrows in FIG. 8. In such a piezoelectric vibrator 10, it is possible to support the vibrating body 12 at both ends or at the center portion, and it is possible to prevent vibration leakage. In the piezoelectric vibrator 10 in FIG. 8, as compared with the piezoelectric vibrator shown in FIG. 1, reaction resulting from shifting of gravity can be offset. It is possible to polarize all of the piezoelectric elements 50a–50f in the same situation and make the driving signals be applied to the piezoelectric elements 50a, 50b, 50e, 50f and the piezoelectric elements 50c, 50d in inverse phase. In the above embodiments, though the rectangular plate-shaped vibrating body 12 is used, a prism-shaped vibrating body or cylindrical vibrating body may be used, and piezoelectric elements may be formed to be opposite to each other with a vibrating body between them. As shown in FIG. 9, it is possible to use a disk-shaped vibrating body 12. In this case, the piezoelectric elements 14a–14d are formed in a concentric circle-shape. The piezoelectric elements 14a, 14b are formed to be opposite to each other with the vibrating body 12 between them, and the piezoelectric elements 14c, 14d are formed to be opposite to each other with the vibrating body 12 between them. The piezoelectric vibrator 10 vibrates in a diametrical direction as shown in FIG. 10. The vibrating body 12 vibrates in such a manner that expansion and contraction take place both portions of a half circle as the center. Hence, no displacement occurs in the outer circle of the vibrating body 12, and the vibrating body 12 can be supported at the outer circle. Thus, many shapes of the vibrating body 12 may be used such as plate-shape or prism-shape.

Figure 11:
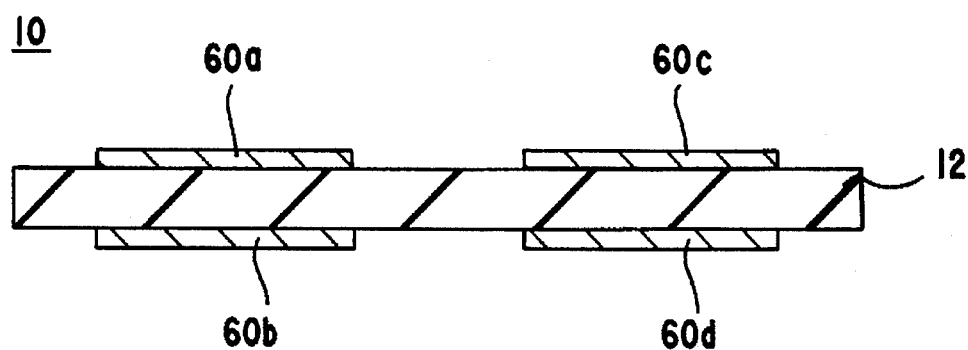
FIG. 11 is a sectional view showing a further embodiment of the piezoelectric vibrator of the invention.

In the above embodiments, as shown in FIG. 11, the vibrating body 12 may be made of piezoelectric ceramics. In this case, electrodes 60a, 60b, 60c and 60d are formed at the same position as the piezoelectric elements 14a–14d.

By applying driving signals having inverse phase to the electrodes 60a, 60b and the electrodes 60c, 60d, it is possible to vibrate the vibrating body 12 in such a manner that expansion and contraction take place simultaneously.

The vibrating body 12 may be polarized partially in an inverse direction. For example, a part which is put between the electrodes 60a and 60b is polarized from the electrode 60a side toward the electrode 60b side, and a part which is put between the electrodes 60c and 60d is polarized from the electrode 60d side toward the electrode 60c side. In this case, by applying driving signals having the same phase to the electrodes 60a, 60b and the electrodes 60c, 60d, it is possible to vibrate the vibrating body 12 in such a manner that expansion and contraction take place simultaneously.

Figure 6:
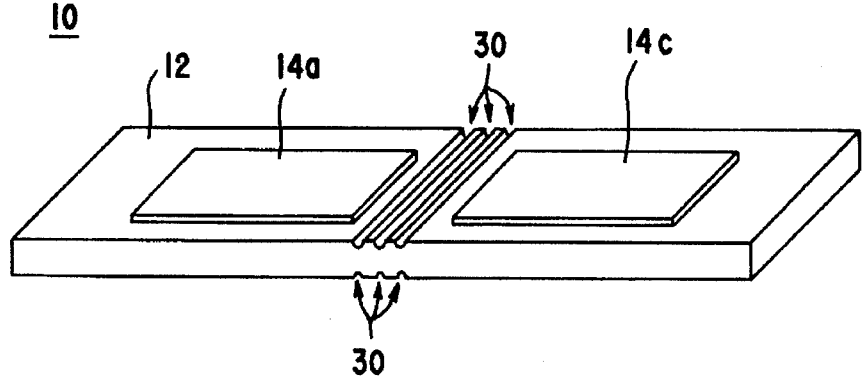
FIG. 6 is a perspective view showing a state when the resonance frequency of the piezoelectric vibrator shown in FIG. 1 is adjusted.

Similarly, in the case of a piezoelectric vibrator having the shapes as shown in FIG. 6, FIG. 8 and FIG. 9, the vibrating body may be made of piezoelectric ceramics, and electrodes may be formed instead of piezoelectric elements at the same places.

In the piezoelectric vibrator of the present invention, the vibrating body 12 can be manufactured by micromachining, etching or press-molding, and a piezoelectric vibrator having good productivity can be obtained.

Figure 12:
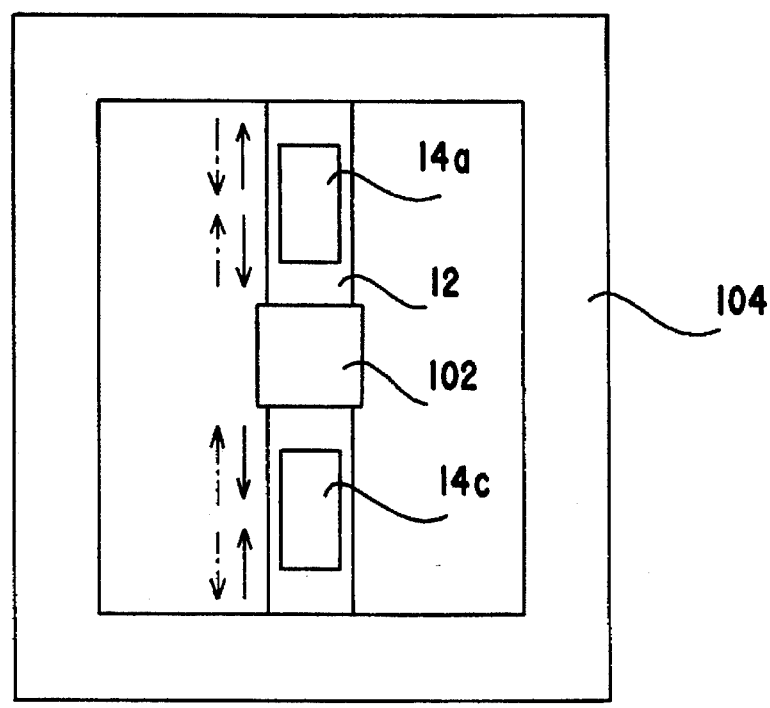
FIG. 12 is a plan view showing a first embodiment of an acceleration sensor of the invention.
Figure 13:
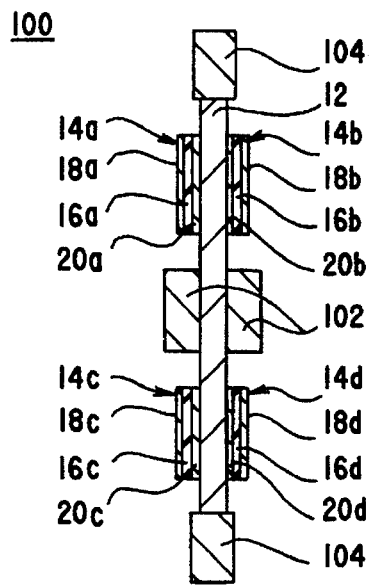
FIG. 13 is a sectional view showing an acceleration sensor shown in FIG. 12.

By using the piezoelectric vibrator 10, an acceleration sensor can be manufactured as shown in FIG. 12 and FIG. 13. In this embodiment, the piezoelectric vibrator shown in FIG. 1 and FIG. 2 is used. In the acceleration sensor 100, weights 102 are attached to the center portion of the vibrating body 12. Piezoelectric elements 14a and 14b are formed on the opposite surfaces of the vibrating body 12 at one side portion of the weights 102. Piezoelectric elements 14c and 14d are formed on the opposite surfaces of the vibrating body 12 at the other side portion of the weights 102.

The vibrating body 12 is supported at both ends by a frame 104 as supporting means. The frame 104 is formed, for example, in a square loop shape, and the vibrating body 12 is arranged at the center of the frame 104. The vibrating body 12 may be supported by other means if it is proper for supporting the vibrating body 12.

Figure 14:
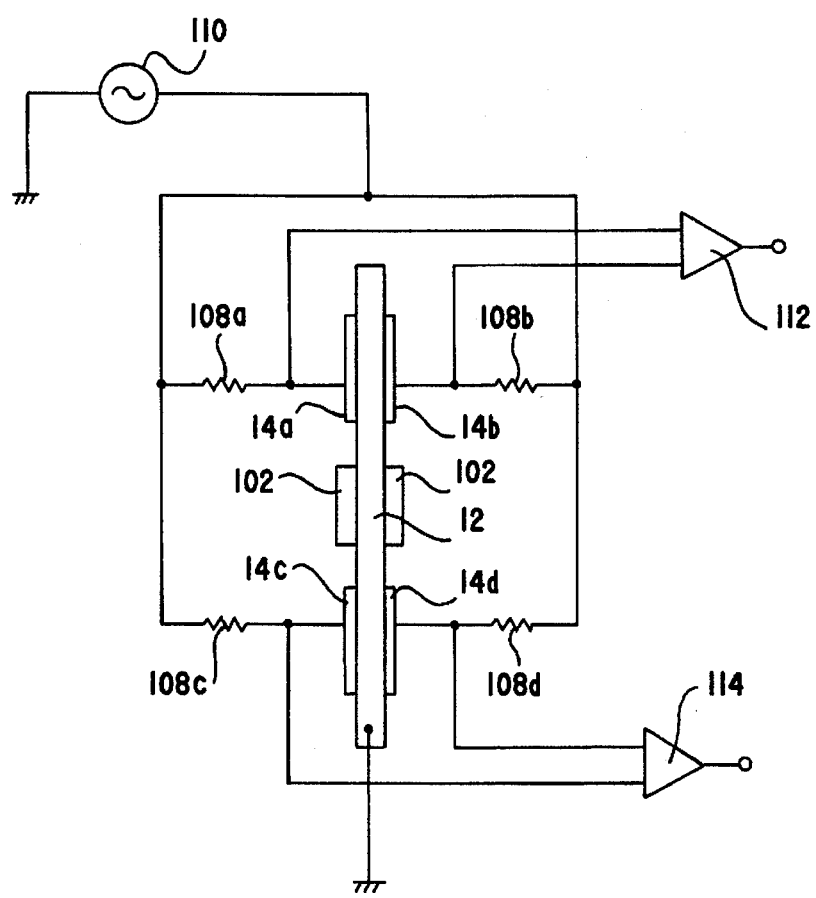
FIG. 14 is a circuit diagram showing a circuit for using the acceleration sensor shown in FIG. 12.

When the acceleration sensor 100 of FIG. 13 is used, as shown in FIG. 14, an oscillation circuit 110 is connected to piezoelectric elements 14a, 14b and the piezoelectric elements 14c, 14d via resistors 108a, 108b, 108c and 108d. By the driving signal from the oscillation circuit 110, as indicated with solid line arrow in FIG. 12, when one side of the vibrating body 12 expands, the other side of the vibrating body 12 contracts with the weights 102 as a center. When one side of the vibrating body 12 contracts, the other side of the vibrating body 12 expands as indicated by the one dot chain line arrow in FIG. 12. In such a way, the vibrating body 12 vibrates in a longitudinal direction. Hence, the displacement of both sides of the vibrating body 12 is offset, and both ends of the vibrating body 12 are not displaced, and results in less vibration leakage from the vibrating body 12 to the frame 104. Therefore, stabilized vibration can be obtained.

Figure 15:
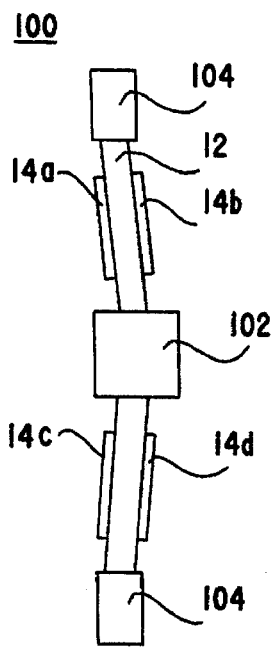
FIG. 15 is an illustrative view showing a state of the vibrating body when the acceleration is given to the acceleration sensor shown in FIG. 12.

By vibrating the vibrating body 12, inertia is applied to the vibrating body 12 and the weights 102. When acceleration is applied to the vibrating body 12 perpendicular to its surface, the vibrating body 12 is bent as shown in FIG. 15. By the bending of the vibrating body 12, voltages are generated in the piezoelectric elements 14a, 14b and the piezoelectric elements 14c, 14d. Therefore, acceleration can be detected by measuring the voltages.

For detecting the acceleration, the voltages generated in the piezoelectric elements 14a, 14b and the piezoelectric elements 14c, 14d are measured. For this purpose, as shown in FIG. 14, the piezoelectric elements 14a, 14b are connected to a differential circuit 112, and the piezoelectric elements 14c, 14d are connected to the differential circuit 114. However, it is not necessary to use two differential circuits, and either differential circuit 112 or 114 may be connected to the piezoelectric elements. By connecting the opposed piezoelectric elements 14a, 14b to the differential circuit 112, the driving signals are offset and only the output signals corresponding to acceleration can be measured. Since the piezoelectric elements 14a and 14b are polarized from the outside surface toward the inside, voltages having inverse phase are generated according to the bending of the vibrating body 12. Hence, a large output can be obtained from the differential circuit 112 when the difference of the output voltages of the piezoelectric elements 14a, 14b is measured, and results in high sensitivity. It is possible to increase the bending of the vibrating body 12 due to acceleration with the weights 102, and if the weights 102 are adjusted according to the detection range of acceleration, further improved sensitivity can be obtained.

In the acceleration sensor 100, since vibration is applied to the weights 102, the acceleration sensor 100 has high responsibility and high sensitivity. Since the vibrating body 12 is supported at both ends, the acceleration sensor 100 having high impact resistance and less in damage can be obtained. Hence, when the acceleration sensor 100 is mounted on a car, the acceleration sensor 100 has no damage due to unevenness of the road, and can detect acceleration by the car with high sensitivity. The vibrating body 12 can be made by stamping or etching easily and at a low cost.

In the above embodiment, though the output voltages of piezoelectric elements 14a, 14b or the piezoelectric elements 14c, 14d are applied to the differential circuit, the difference between the output voltages of the piezoelectric elements 14a, 14b which are formed at the same surface or the output voltages of piezoelectric elements 14c, 14d may be measured. The four piezoelectric elements 14a, 14b, 14c, 14d may be connected to form a bridge circuit or the like for detecting acceleration.

Though the piezoelectric elements 14a, 14b and the piezoelectric elements 14c, 14d are polarized in an inverse situation, these piezoelectric elements may be polarized in the same situation. In this case, driving signals having inverse phase are applied to the piezoelectric elements 14a, 14b and the piezoelectric elements 14c, 14d. In this way, the vibration described in the above embodiment can be obtained. When this driving method is used, the voltages generated between the piezoelectric elements 14a and 14c on the same surface have the same phase, as well as the voltages generated between the piezoelectric elements 14b, 14d. Hence, when the output signals of the piezoelectric elements on the same surface are used for measuring, a large output can be obtained by using a cumulative circuit. Since the driving signals to be applied to the piezoelectric elements have inverse phases, these signals are offset by means of the cumulative circuit.

Further, the number of the piezoelectric elements is not necessarily four and, for example, only opposed two piezoelectric elements 14a and 14b may be formed. As such, vibration as described above can be obtained if a pair of opposed piezoelectric elements are formed on both surfaces of the vibrating body 12.

Figure 16:
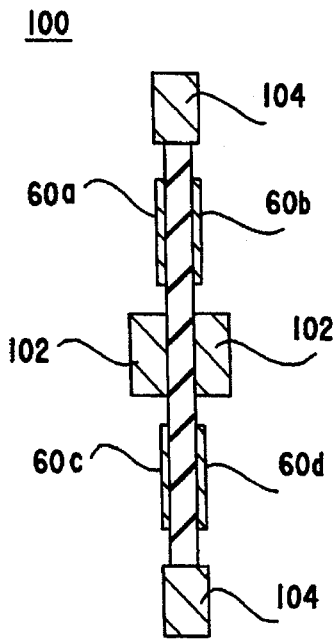
FIG. 16 is a sectional view showing a second embodiment of an acceleration sensor of the invention.

Needless to say, it is possible to make an acceleration sensor 100 by using the vibrating body shown in FIG. 11. In this case, weights 102 are formed at the center portion of the vibrating body 12 made of piezoelectric material as shown in FIG. 16, and electrodes 60a, 60b, 60c. 60d are formed on both surfaces of the vibrating body 12. The vibrating body 12 vibrates in such a manner that longitudinal expansion and contraction take place simultaneously by applying driving signals having inverse phase to the electrodes 60a, 60b and the electrodes 60c, 60d. When acceleration is applied to the acceleration sensor 100 perpendicular to the surface of the vibrating body 12, the vibrating body 12 is bent, and output signals corresponding to the acceleration can be obtained from the electrodes 60a–60d.

The vibrating body 12 may be polarized partially in an inverse direction. For example, a part which is put between the electrodes 60a and 60b is polarized from the electrode 60a side toward the electrode 60b side, and a part which is put between the electrodes 60c and 60d is polarized from the electrode 60d side toward the electrode 60c side. In this case, by applying driving signals having the same phase to the electrodes 60a, 60b and the electrodes 60c, 60d, it is possible to vibrate the vibrating body 12 in such a manner that expansion and contraction take place simultaneously.

Figure 17:
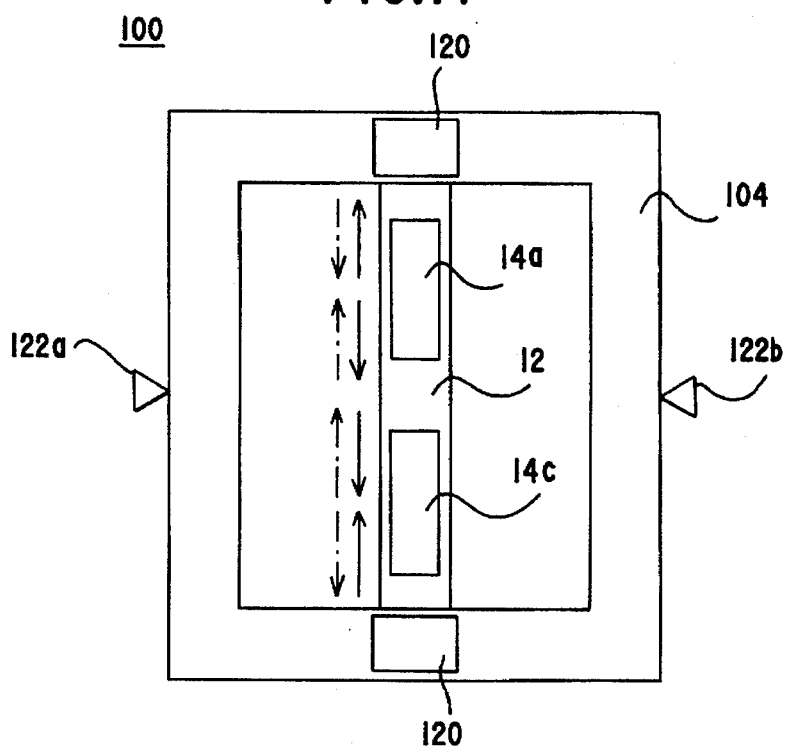
FIG. 17 is a plan view showing a third embodiment of an acceleration sensor of the invention.
Figure 18:
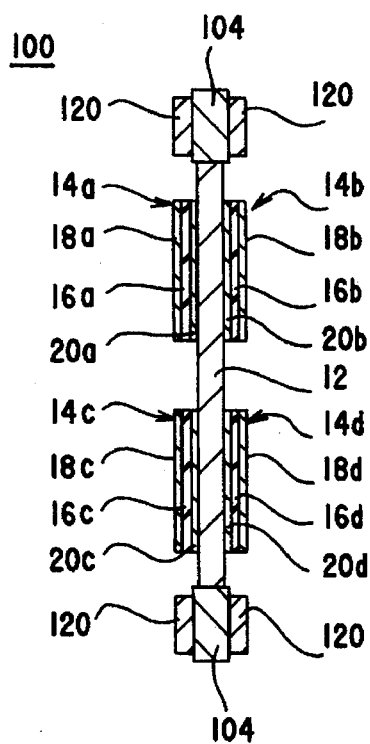
FIG. 18 is a sectional view showing an acceleration sensor shown in FIG. 17.

Weights 120 may be attached to both longitudinal ends of the vibrating body 12 as shown in FIG. 17 and FIG. 18. The weights 120 are formed to be opposite to both faces of, for example, a frame 104. The frame 104 is supported at the supporting portions 122a, 122b which corresponds to the longitudinal center of the vibrating body 12. That is, these supporting portions 122a, 122b are positioned at the center of the parts of frame 104 which is parallel to the vibrating body 12.

Figure 19:
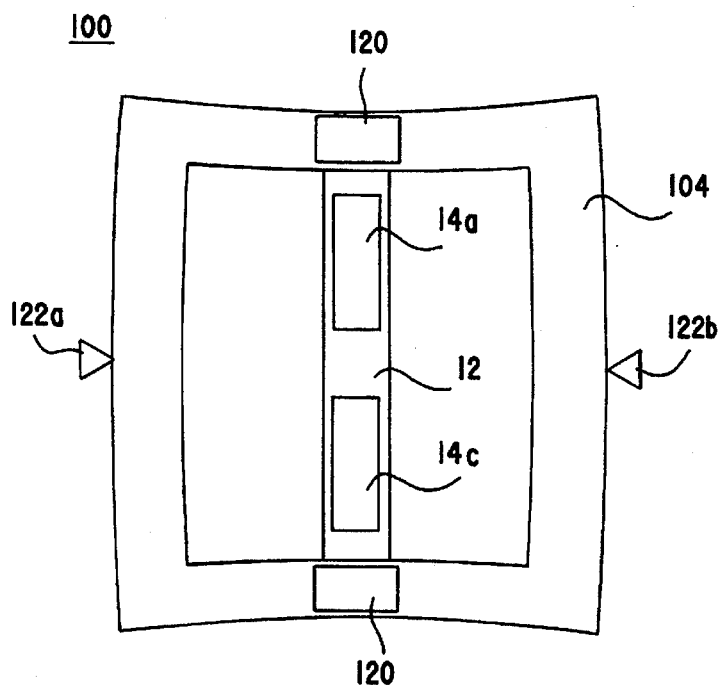
FIG. 19 is a plan view showing a state of the acceleration sensor when acceleration is applied to the acceleration sensor shown in FIG. 17.
Figure 20:
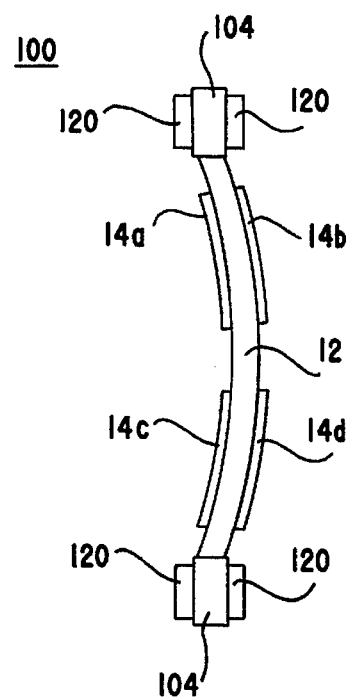
FIG. 20 is a sectional illustrative view showing an acceleration sensor shown in FIG. 19.

In this acceleration sensor 100 too, the vibrating body 12 can be vibrated by using the circuit shown in FIG. 14. When acceleration is applied to the acceleration sensor 100 perpendicular to the surface of the vibrating body 12, the vibrating body 12 is bent as shown in FIG. 19 and FIG. 20. When the vibrating body 12 bends, the frame 104 is deformed with the supporting portions 122a, 122b as the center by the mass of the weights 120 attached to both longitudinal ends of the vibrating body 12. The bending of the vibrating body 12 due to acceleration is increased by the deformation of the frame. This bending results with vibration of the vibrating body 12, and resulting in variation of the resonance characteristics. By measuring the variation of resonance characteristics, acceleration can be detected. In order to detect the acceleration, the difference between the output signals of the piezoelectric elements 14a, 14b or the difference between the output signals of the piezoelectric elements 14c, 14d is measured like the acceleration sensor shown in FIG. 12 and FIG. 13.

Such an acceleration sensor 100 has high responsibility and high sensitivity.

Figure 21:
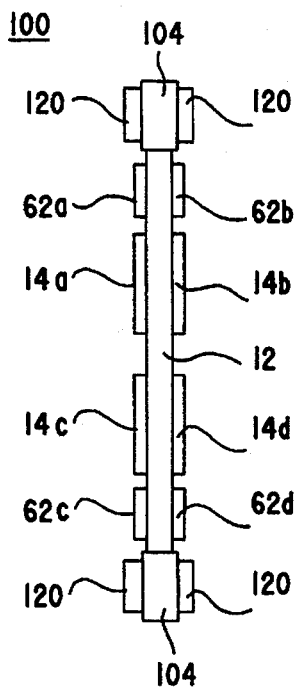
FIG. 21 is a sectional illustrative view showing a fourth embodiment of an acceleration sensor of the invention.

As shown in FIG. 21, piezoelectric elements 62a, 62b, 62c, 62d for detecting may be formed besides the piezoelectric elements 14a, 14b, 14c, 14d for driving. In the embodiment shown in FIG. 21, the piezoelectric elements 62a–62d for detecting are formed on the frame 104 side of the vibrating body 12. Acceleration applied to the acceleration sensor 100 can be detected by measuring the voltages generated in the piezoelectric elements 62a–62d for detecting according to the bending of the vibrating body 12 due to the acceleration.

Figure 22:
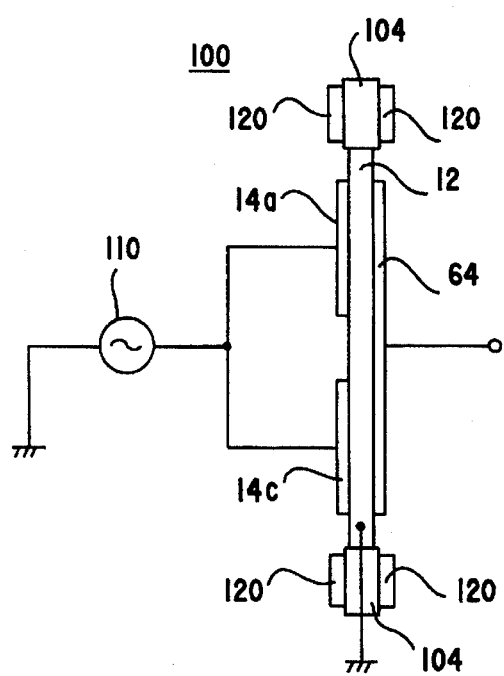
FIG. 22 is a sectional illustrative view showing a fifth embodiment of an acceleration sensor of the invention.

As shown in FIG. 22, the piezoelectric elements 14a, 14c for driving may be formed on one surface of the vibrating body 12, and a piezoelectric element 64 for detecting may be formed on the other surface of the vibrating body 12. In this case, the piezoelectric element 64 for detecting is formed to be symmetric with respect to the longitudinal center of the vibrating body 12. In the acceleration sensor 100, an oscillation circuit 110 is connected to the piezoelectric elements 14a, 14c for driving and the vibrating body 12 is vibrated. When the vibrating body 12 of the acceleration sensor 100 does not bend, the voltage generated in the piezoelectric element 64 for detecting is offset because expansion and contraction take place inversely at both sides of the central portion of the piezoelectric element 64 for detecting. When, the vibrating body 12 bends by the acceleration, difference of bending occures between both side portions of the center of the piezoelectric element 64 for detecting, and output voltage which is not offset is obtained. Hence, the acceleration can be detected by measuring the output voltage of the piezoelectric element 64 for detecting.

Figure 23:
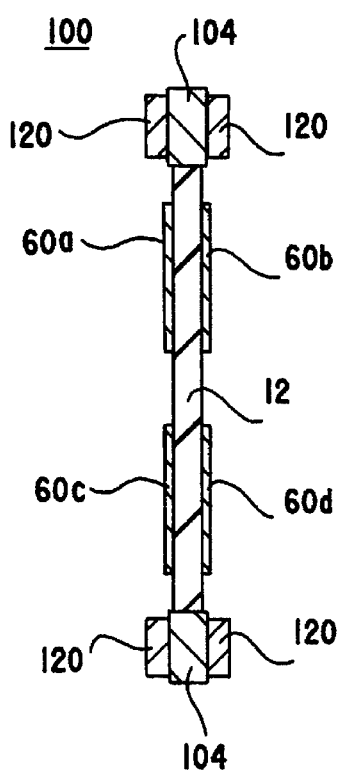
FIG. 23 is a sectional view showing a sixth embodiment of an acceleration sensor of the invention.

In the above embodiments, though the vibrating body or the frame made of metallic material or the like is used, these may be made of piezoelectric ceramics as shown in FIG. 23. In this case, electrodes 60a–60d are formed instead of the piezoelectric elements on the vibrating body like the acceleration sensor shown in FIG. 16. By applying driving signals having inverse phase to the electrodes 60a, 60b and the electrodes 60c, 60d, it is possible to vibrate the vibrating body in such a manner that longitudinal expansion and contraction take place simultaneously. By measuring the output signals from the electrodes, it is possible to detect the acceleration.

The vibrating body 12 may be polarized partially in an inverse direction. For example, a part which is put between the electrodes 60a and 60b is polarized from the electrode 60a side toward the electrode 60b side, and a part which is put between the electrodes 60c and 60d is polarized from the electrode 60d side toward the electrode 60c side. In this case, by applying driving signals having the same phase to the electrodes 60a, 60b and the electrodes 60c, 60d, it is possible to vibrate the vibrating body 12 in such a manner that expansion and contraction take place simultaneously.

Similarly, in the case of an acceleration sensor having a shape as shown in FIG. 21 and FIG. 22, the vibrating body may be made of a piezoelectric ceramics and electrodes may be formed instead of the piezoelectric elements.

Figure 24:
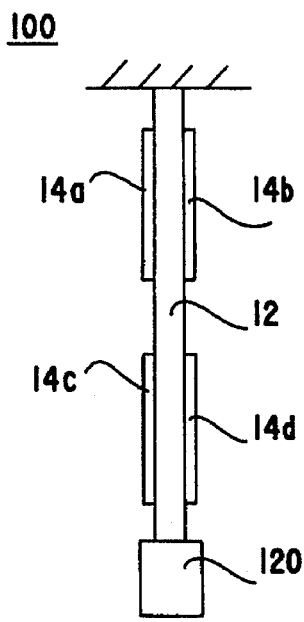
FIG. 24 is a sectional illustrative view showing a seventh embodiment of an acceleration sensor of the invention.

The vibrating body 12 is not always necessarily fixed to the frame, and may be a cantilever structure as shown in FIG. 24. In this case, a weight 120 is attached to one longitudinal end of the vibrating body 12. In such an acceleration sensor 100, the vibrating body 12 is bent by acceleration, and an output corresponding to the bending can be obtained.

Figure 25:
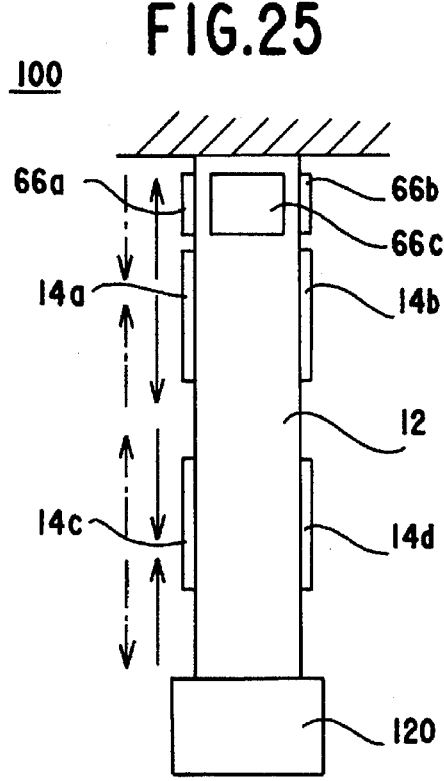
FIG. 25 is a plan view showing an eighth embodiment of an acceleration sensor of the invention.
Figure 26:
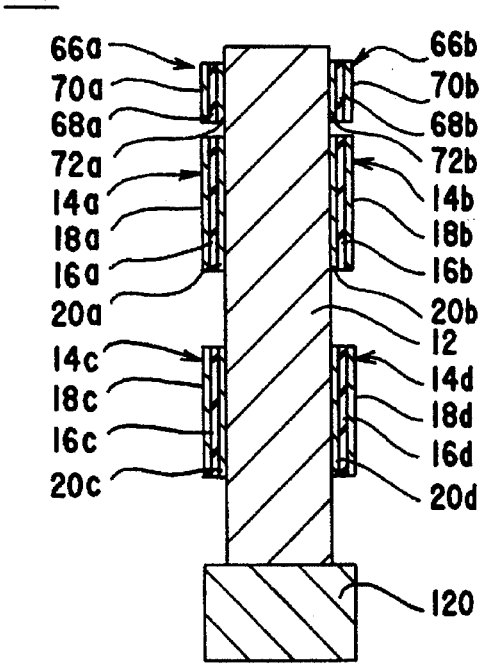
FIG. 26 is a sectional view showing an acceleration sensor shown in FIG. 25 which is cut across one opposite side.

FIG. 25 is a plan view showing an acceleration sensor which can detect acceleration in a plurality of directions. An acceleration sensor 100 includes, for example, a vibrating body 12 formed in a regular rectangular prism shape. At one longitudinal end side of the vibrating body 12, piezoelectric elements 14a, 14b for driving are formed on the opposite surfaces of the vibrating body 12 as shown in FIG. 26. At the other longitudinal end side of the vibrating body 12, the other piezoelectric elements 14c, 14d for driving are formed on the surfaces on which the piezoelectric elements 14a, 14b for driving are formed. In the piezoelectric elements 14a–14d for driving, the piezoelectric plates 16a, 16b are polarized from an outside surface toward the vibrating body 12 side, and the piezoelectric plates 16c, 16d are polarized from the vibrating body 12 side toward the outside surface.

Figure 27:
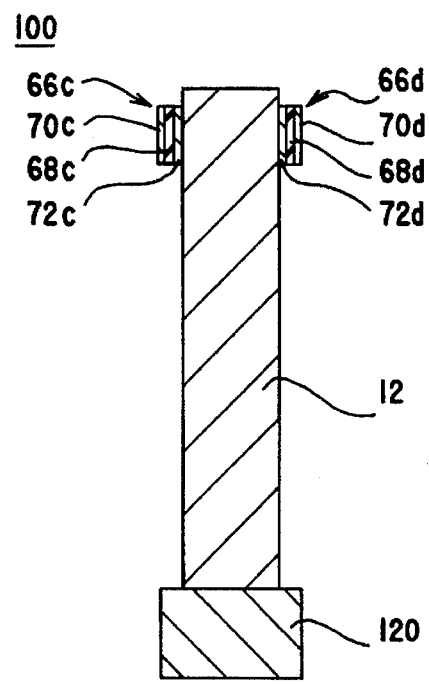
FIG. 27 is a sectional view showing an acceleration sensor shown in FIG. 25 which is cut across the other opposite side.

Piezoelectric elements 66a, 66b for detecting are formed on the surfaces on which the piezoelectric elements 14a, 14b for driving are formed. The piezoelectric elements 66a, 66b for detecting are formed adjacent to the piezoelectric elements 14a, 14b for driving and formed at one end side of the vibrating body 12. On the surfaces on which the piezoelectric elements 66a, 66b for detecting are not formed, the other piezoelectric elements 66c, 66d for detecting are formed as shown in FIG. 27. The piezoelectric elements 66c, 66d for detecting are formed at one longitudinal end side of the vibrating body 12.

The piezoelectric elements 66a, 66b, 66c, 66d for detecting include piezoelectric plates 68a, 68b, 68c, 68d. On both faces of the piezoelectric plates 68a, 68b, 68c, 68d, electrodes 70a, 72a, electrodes 70b, 72b, electrodes 70c, 72c and electrodes 70d, 72d are formed respectively. The electrodes 72a, 72b, 72c, 72d on one surface of these piezoelectric plates 66a, 66b, 66c, 66d for detecting are bonded to the side faces of the vibrating body 12. In the piezoelectric elements 66a, 66b, 66c, 66d, the piezoelectric plates 68a, 68b, 68c, 68d are polarized, for example, from the outside surface toward the vibrating body 12 side.

Figure 28:
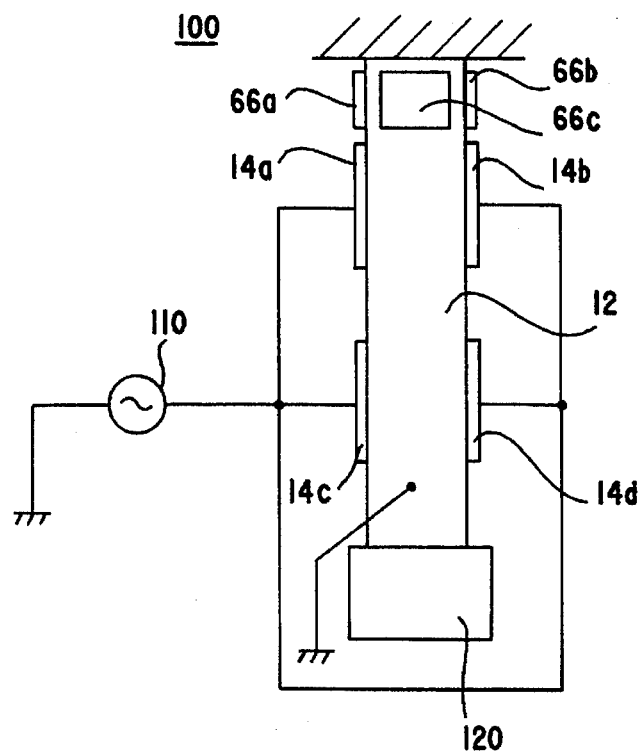
FIG. 28 is a circuit diagram showing a driving circuit for vibrating an acceleration sensor shown in FIG. 25.

In the acceleration sensor 100, for example, one end of the vibrating body 12 is supported, and a weight 120 is attached to the other end of the vibrating body 12. Hence, in this embodiment, the vibrating body 12 has a cantilever structure. When the acceleration sensor 100 is used, an oscillation circuit 110 is connected to the piezoelectric elements 14a–14d for driving as shown in FIG. 28. By the oscillation circuit 110, the vibrating body 12 vibrates in a longitudinal direction as indicated with arrows in FIG. 25.

Figure 29:
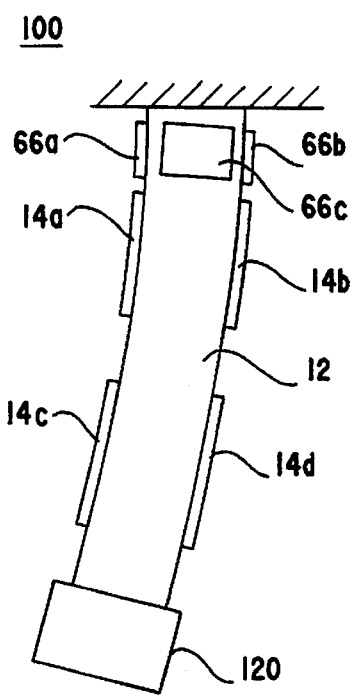
FIG. 29 is an illustrative view showing a state that acceleration is given to an acceleration sensor shown in FIG. 25.

When acceleration is applied to the acceleration sensor 100, for example, perpendicular to the surfaces of the piezoelectric elements 66a, 66b for detecting, the vibrating body 12 bends in the direction perpendicular to the surfaces of the piezoelectric elements 66a, 66b for detecting as shown in FIG. 29. Bending of the vibrating body 12 interferes with the vibration of the vibrating body 12, and results in variation of the resonance characteristics. By measuring the variation of resonance characteristics, acceleration can be detected. In order to detect the acceleration, the voltages generated in the piezoelectric elements 66a, 66b for detecting are measured. In order to detect the acceleration perpendicular to the surfaces of the piezoelectric elements 66c, 66d for detecting, the voltages generating in the piezoelectric elements 66c, 66d for detecting are measured.

Figure 30:
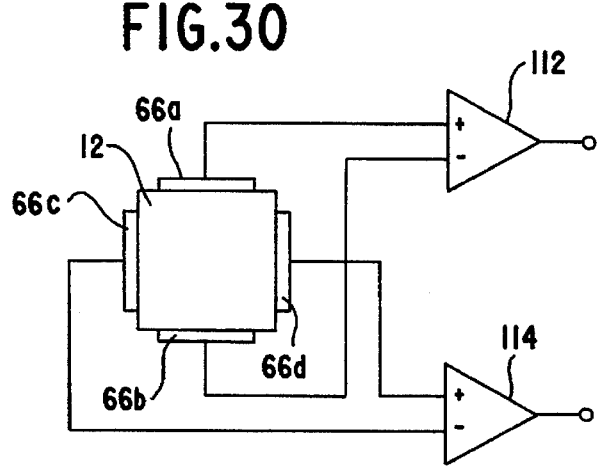
FIG. 30 is a circuit diagram showing a detecting circuit for measuring an output voltage of an acceleration sensor shown in FIG. 25.

For detecting the acceleration, as shown in FIG. 30, the piezoelectric elements 66a, 66b for detecting are connected to the differential circuit 112, and the other piezoelectric elements 66c, 66d for detecting are connected to the other differential circuit 114. Since the piezoelectric elements 66a–66d are polarized from the outside surface toward the vibrating body 12 side, the voltages having the same magnitude and the same phase are generated in the piezoelectric elements 66a–66d when no acceleration is applied to the acceleration senser 100. Therefore, the outputs from the differential circuit 112 and 114 are zero. When acceleration is applied to the acceleration sensor 100 and the vibrating body 12 is bent, voltages having the inverse phase are generated in the opposed piezoelectric elements. Hence, by measuring the difference between output voltages of the opposed piezoelectric elements 66a, 66b for detecting, a large output signal can be obtained from the differential circuit 112. Therefore, the acceleration in the direction perpendicular to the surfaces of the piezoelectric elements 66a, 66b for detecting can be detected with a high sensitivity. Similarly, by measuring the difference between the output voltages of the piezoelectric elements 66c, 66d for detecting, the acceleration in the direction perpendicular to the surfaces of the piezoelectric elements 66c, 66d for detecting can be detected with a high sensitivity.

When the acceleration not perpendicular to the surfaces of the piezoelectric elements 66a–66d is applied to the accelerlation sensor, the vibrating body 12 bends in the direction along which the acceleration is applied. The voltages corresponding to the bending of the vibrating body 12 is generated in the piezoelectric elements 66a–66d for detecting. That is, voltages generated in the piezoelectric elements 66a–66d for detecting corresponds to the acceleration components in the direction perpendicular to the surfaces of the piezoelectric elements 66a–66d. Therefore, the acceleration in all directions perpendicular to the center axis can be detected by measuring the output signals from the differential circuits 112 and 114.

Figure 31:
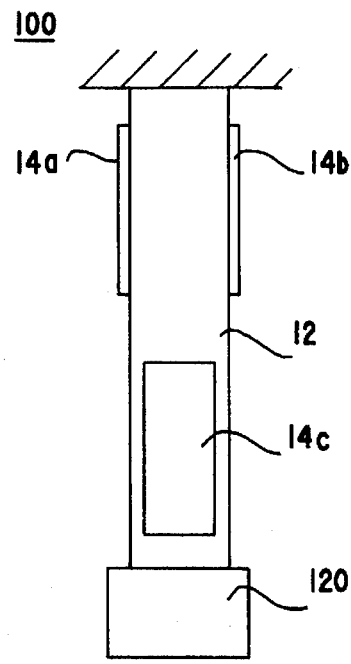
FIG. 31 is a plan view showing a ninth embodiment of an acceleration sensor of the invention.
Figure 32:
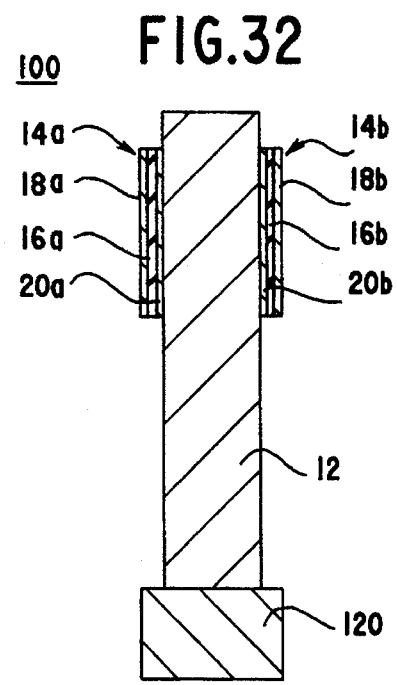
FIG. 32 is a sectional view showing an acceleration sensor shown in FIG. 31 which is cut across one opposite side.
Figure 33:
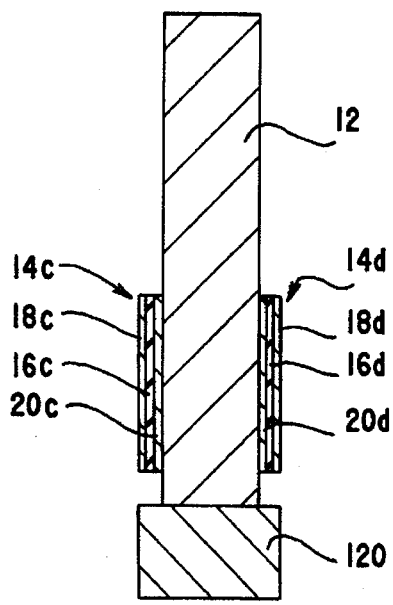
FIG. 33 is a sectional view showing an acceleration sensor shown in FIG. 31 which is cut across the other opposite side.
Figure 34:
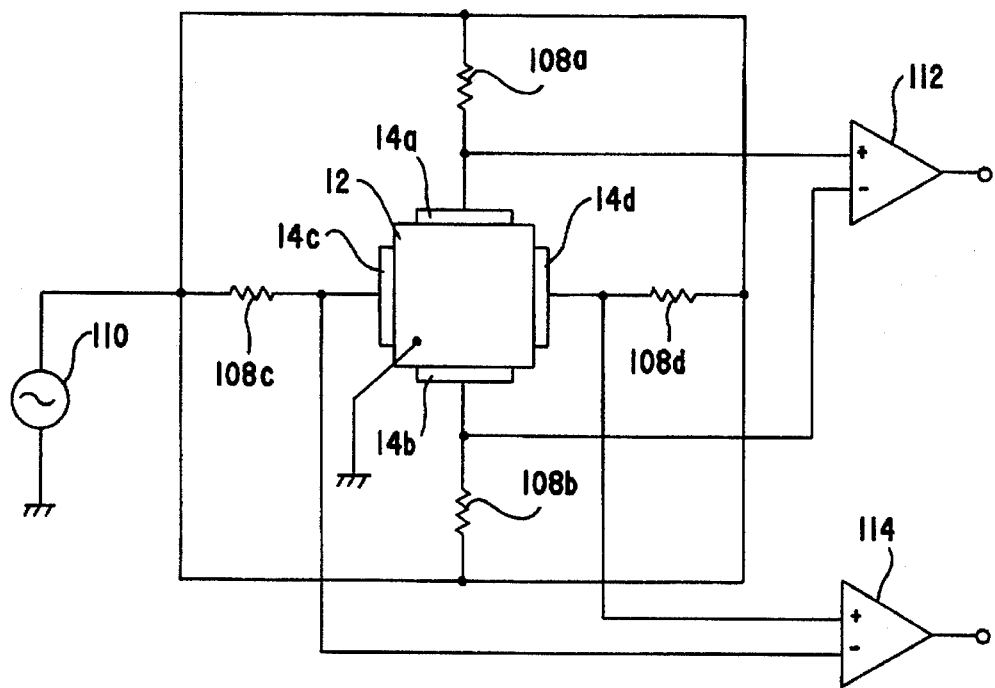
FIG. 34 is a circuit diagram showing a driving circuit and a detecting circuit for an acceleration sensor shown in FIG. 31.

The piezoelectric elements 66a–66d for detecting are not necessarily essential, and the piezoelectric elements 14a–14d for driving may be used for detecting. In this case, as shown in FIG. 31, FIG. 32 and FIG. 33, the piezoelectric elements 14a, 14b for driving and the piezoelectric elements 14c, 14d for driving are formed on different opposite surfaces of the vibrating body 12. The piezoelectric elements 14a, 14b for driving are formed at one end side of the vibrating body 12, and the piezoelectric elements 14c, 14d for driving are formed at the other end side of the vibrating body 12. In the acceleration sensor 100, the piezoelectric elements 14a, 14b for driving and the piezoelectric elements 14c, 14d for driving are polarized in the inverse direction. As shown in FIG. 34, an oscillation circuit 110 is connected to the piezoelectric elements 14a–14d for driving via the resistors 108a, 108b, 108c, 108d. By the signal from the oscillation circuit 110, the vibrating body 12 vibrates in a longitudinal direction. By applying the signals having the same phase to the piezoelectric elements 14a–14d for driving, the vibrating body 12 vibrates in such a manner that longitudinal expansion and contraction take place inversely on both sides of the center portion of the vibrating body 12. The piezoelectric elements 14a, 14b for driving are connected to the input terminal of the differential circuit 112, and the piezoelectric elements 14c, 14d for driving are connected to the input terminal of the differential circuit 114. When acceleration is applied to the acceleration sensor 100 and the vibrating body 12 is bent, a voltage is generated in each piezoelectric elements 14a–14d. By measuring the differences between these voltages by the differential circuits 112 and 114, the acceleration applied to the acceleration sensor 100 can be detected. The driving signals applied to the piezoelectric elements 14a–14d are offset in the differential circuits 112 and 114. Therefore, only the output signals corresponding to the acceleration are obtained from the output terminals of the differential circuits 112 and 114.

In the above embodiment, the vibrating body 12 is not necessarily of the cantilever structure, and may be the structure that both ends of the vibrating body 12 are supported. In this case, for example, the vibrating body 12 is supported with a frame or the like. Thus, even if the vibrating body 12 has a structure that the vibrating body 12 is supported at both ends, vibration leakage is small because both end portions of the vibrating body 12 are not displaced. Therefore, an acceleration sensor having excellent characteristics can be obtained. In the acceleration sensor having a structure that the vibrating body 12 is supported at both ends, weights may be formed at both ends of the vibrating body 12. In this way, when the vibrating body 12 bends, bending can be increased by the mass of the weight, and the acceleration sensor having a high sensitivity can be obtained.

In the above embodiments, though the piezoelectric elements 14a, 14b and the piezoelectric elements 14c, 14d are polarized in the inverse direction, all piezoelectric elements 14a–14d may be polarized in the same direction. That is, the piezoelectric elements 14a–14d may be polarized from the outside surface toward the vibrating body 12 side, and may be polarized from the vibrating body 12 side toward the outside surface. In such a case, the driving signals applied to the piezoelectric elements 14a, 14b and the driving signals applied to the piezoelectric elements 14c, 14d have inverse phase. In this way, the vibrating body 12 can be vibrated in such a manner that longitudinal expansion and contraction take place inversely at both sides of the center portion of the vibrating body 12.

As to the shape of the vibrating body 12, it may be any of a pentagonal prism shape such as hexagonal prism shape or octagonal prism shape or columner shape. With any of such columner shape or prism shape, acceleration can be detected if the piezoelectric elements for driving are formed at opposite side faces and the piezoelectric elements are formed at a plurality of positions along its periphery.

Figure 35:
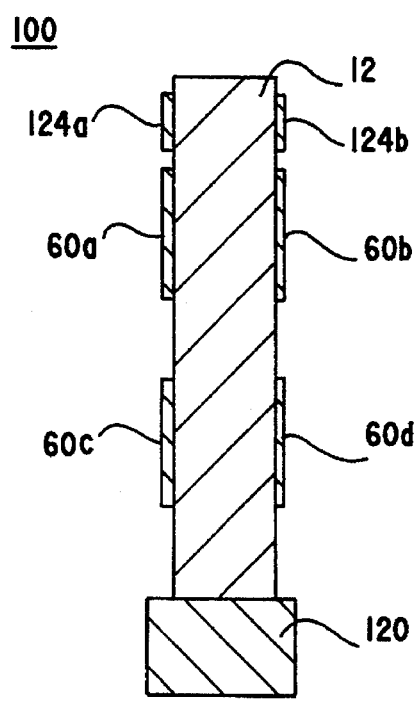
FIG. 35 is a sectional view showing a tenth embodiment of an acceleration sensor of the invention.
Figure 36:
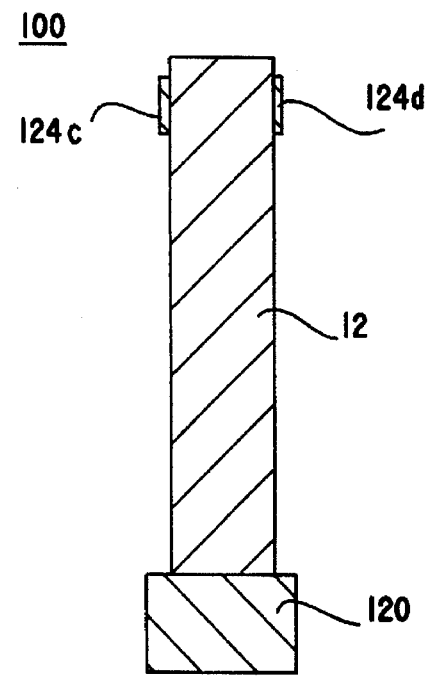
FIG. 36 is a sectional view showing an acceleration sensor shown in FIG. 35 which is cut across the other side.

As shown in FIG. 35 and FIG. 36, the vibrating body may be made of a piezoelectric ceramics. In this case, electrodes 60a, 60b, 60c, 60d for driving and electrodes 124a, 124b, 124c, 124d for detecting are formed instead of the piezoelectric elements. The vibrating body 12 can be vibrated by applying the driving signals having inverse phase to the electrodes 60a, 60b for driving and the electrodes 60c, 60d for driving. By measuring the output voltages from the electrodes 124a–124d for detecting, acceleration can be detected.

The vibrating body 12 may be polarized partially in an inverse direction. For example, a part which is put between the electrodes 60a and 60b is polarized from the electrode 60a side toward the electrode 60b side, and a part which is put between the electrodes 60c and 60d is polarized from the electrode 60d side toward the electrode 60c side. In this case, by applying driving signals having the same phase to the electrodes 60a, 60b for driving and the electrodes 60c, 60d for driving, it is possible to vibrate the vibrating body 12 in such a manner that expansion and contraction take place simultaneously.

When the vibrating body 12 is made of piezoelectric ceramics, the shape of the electrode is not necessarily plate-shape, and may be, for example, a comb-like. Similarly, in the acceleration sensor having a shape shown in FIGS. 31–33, the vibrating body may be made of piezoelectric ceramics, and electrodes may be formed instead of the piezoelectric elements.

In the case of the acceleration sensor having a shape shown in FIGS. 31–33, when the vibrating body is made of piezoelectric ceramics, electrodes are formed instead of the piezoelectric elements 14a–14d. The vibrating body is polarized partially in a different direction. That is, the vibrating body is polarized in the direction perpendicular to the opposed electrodes. Therefore, the vibrating body has two parts which are polarized at a right angle with each other. In such an acceleration sensor, by applying driving signals to the electrodes, the vibrating body can be vibrated such that longitudinal expansion and contraction take place simultaneously. The phase of driving signals is decided by the polarizing direction of the vibrating body and connecting mode of oscillation circuit.

Figure 37:
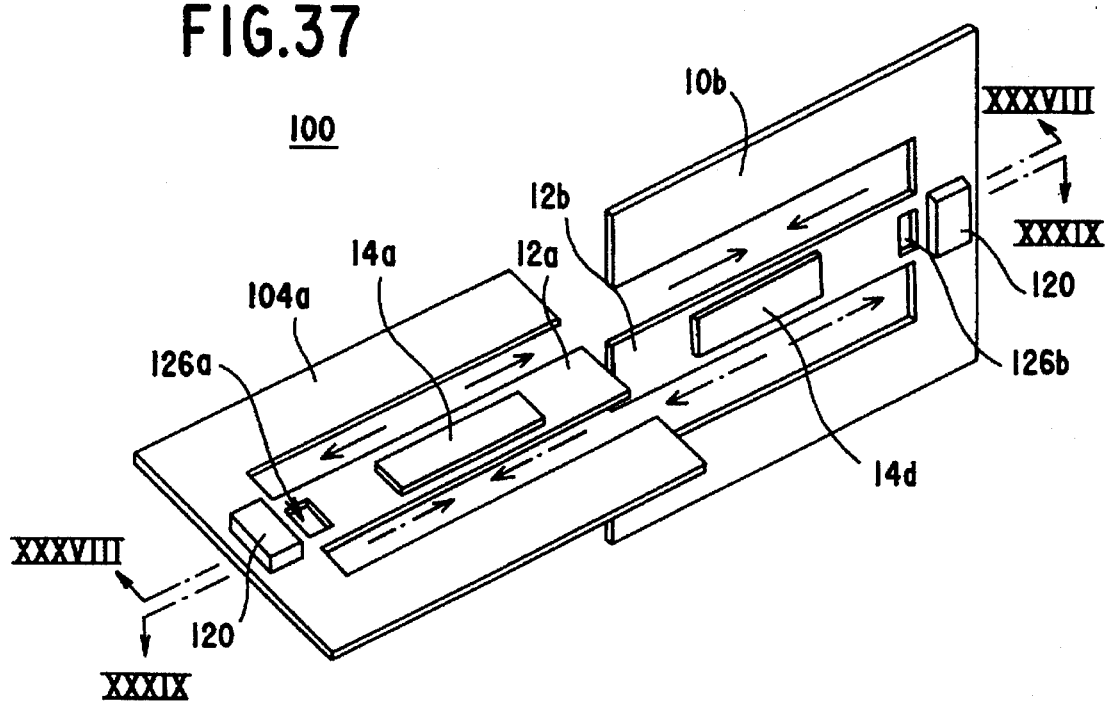
FIG. 37 is a perspective view showing an eleventh embodiment of an acceleration sensor of the invention.
Figure 38:
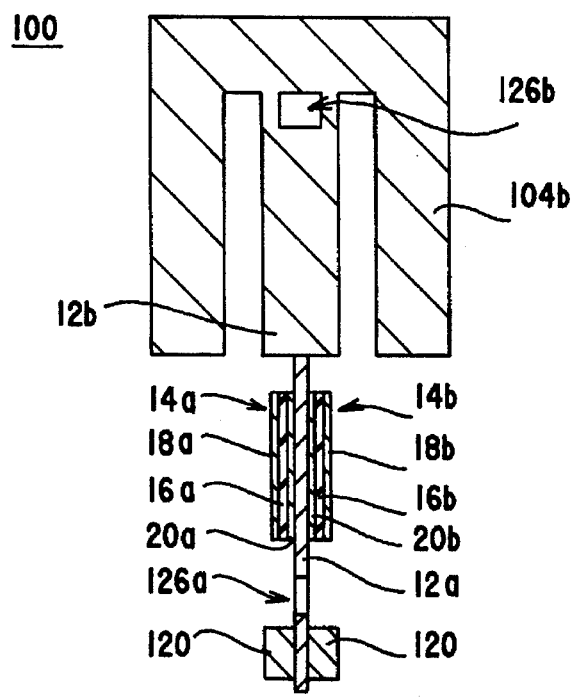
FIG. 38 is a sectional view showing an acceleration sensor shown in FIG. 37 taken along the line XXXVIII—XXXVIII.
Figure 39:
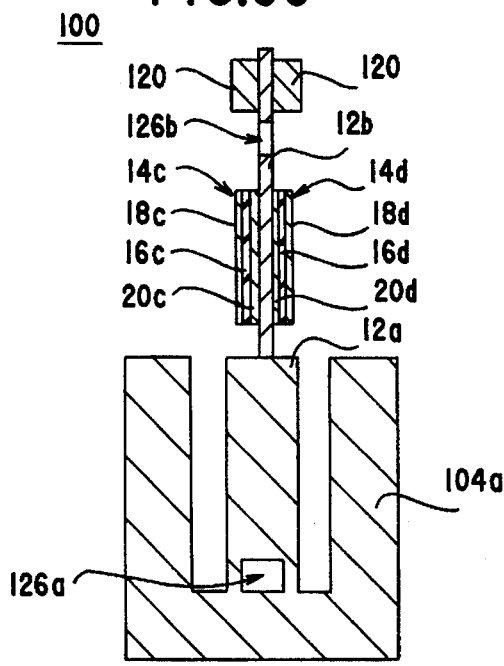
FIG. 39 is a sectional view showing an acceleration sensor shown in FIG. 37 taken along the line XXXIX—XXXIX.

FIG. 37 is a perspective view showing another example of an acceleration sensor which can detect acceleration in a plurality of directions, and FIG. 38 and FIG. 39 are the sectional views taken along the lines XXXVIII—XXXVIII and XXXIX—XXXIX respectively. The acceleration sensor 100 includes a first vibrating body 12a in a rectangular plate shape. A second vibrating body 12b in a rectangular plate shape is formed at a longitudinal end of the first vibrating body 12a. The first vibrating body 12a and the second vibrating body 12b are arranged so that the surface of the first vibrating body 12a and the surface of the second vibrating body 12b are crossed at a right angle on one central axis. The first vibrating body 12a and the second vibrating body 12b may be connected, for example, by welding or soldering. The connected first vibrating body 12a and second vibrating body 12b may be formed by stamping the metal plate and by twisting it at the center.

Piezoelectric elements 14a, 14b are formed on opposite surfaces of the first vibrating body 12a, and piezoelectric elements 14c, 14d are formed on opposite surfaces of the second vibrating body 12b. In the piezoelectric elements 14a–14d, piezoelectric plates 16a, 16b are polarized from the outside surface toward the first vibrating body 12a side, and piezoelectric plates 16c, 16d are polarized from the second piezoelectric body 12b side toward the outside surface.

The first vibrating body 12a is supported with a first frame 104a. The first frame 104a is formed in a U-shape, and the first vibrating body 12a is fixed to the center portion of the first frame 104a. The first vibrating body 12a is connected with the first frame 104a at both width ends. Hence, a hole 126a is made at the connecting part of the first vibrating body 12a and the first frame 104a. Weights 120 are formed at the end portion of the first vibrating body 12a.

Similarly, the second vibrating body 12b is supported with a second frame 104b. The second frame 104b is formed in a U-shape, and the second vibrating body 12b is fixed to the center portion of the second frame 104b. The second vibrating body 12b is connected with the second frame 104b at both width ends. Hence, a hole 126b is made at the connecting part of the second vibrating body 12b and the second frame 104b. Weights 120 are formed at the end portion of the second vibrating body 12b.

Figure 40:
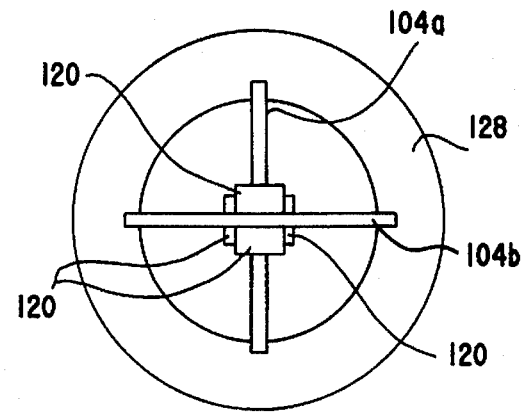
FIG. 40 is a plan view showing a state in which an acceleration sensor shown in FIG. 37 is held by the holding member.

As shown in FIG. 40, the first frame 104a and the second frame 104b are held by a ring-shaped holding member 128. At the position corresponding to the connecting part of the first vibrating body 12a and the second vibrating body 12b, each frame 104a, 104b is held by the holding member 128.

Figure 41:
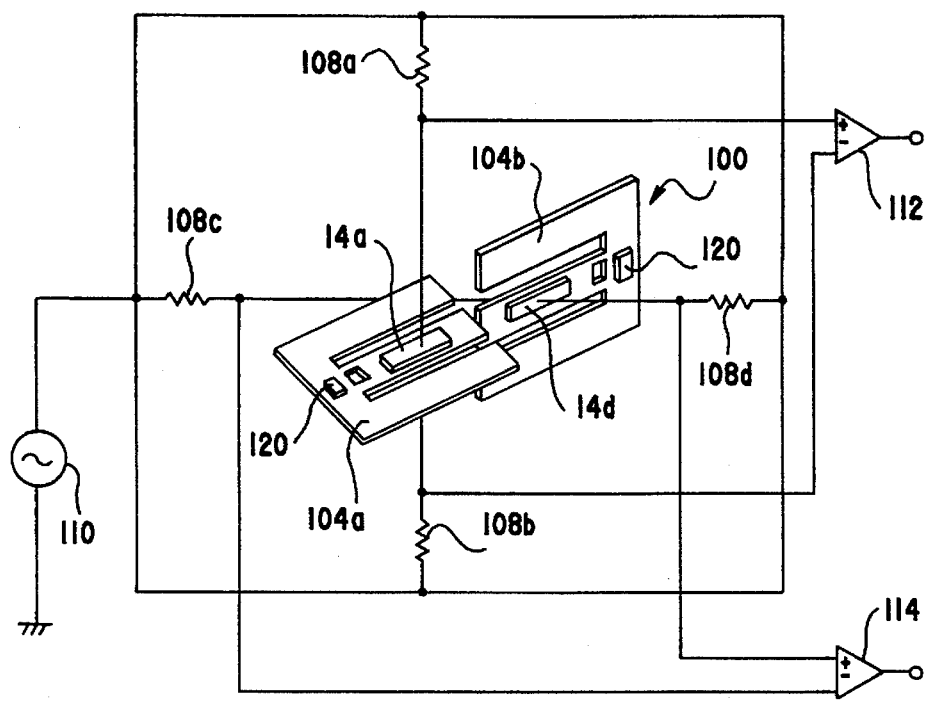
FIG. 41 is a circuit diagram showing a circuit for an acceleration sensor shown in FIG. 37 when it is used.

When the acceleration sensor 100 is used, as shown in FIG. 41, an oscillation circuit 110 is connected to the piezoelectric elements 14a, 14b, 14c, 14d via resistors 108a, 108b, 108c, 108d. The piezoelectric elements 14a, 14b are connected to the first differential circuit 112, and the piezoelectric elements 14c, 14d are connected to the second differential circuit 114.

When the acceleration sensor 100 is used, the driving signal having the same phase is applied to the piezoelectric elements 14a, 14b, 14c, 14d. Then, each vibrating body 12a, 12b is vibrated in a longitudinal direction. As indicated with the solid line arrow in FIG. 37, when the first vibrating body 12a expands, the second vibrating body 12b contracts. Also, as indicated with the one dot chain line arrow in FIG. 37, when the first vibrating body 12a contracts, the second vibrating body 12b expands. Hence, displacement at both ends of the vibrating bodies 12a, 12b is offset, and the vibration leakage to the frames 104a, 104b is small because the end of the frame side of each vibrating body 12a, 12b does not displace. Therefore, a stabilized vibration can be obtained.

By vibrating the first vibrating body 12a and the second vibrating body 12b, inertia is applied to the vibrating bodies 12a, 12b.

Figure 42:
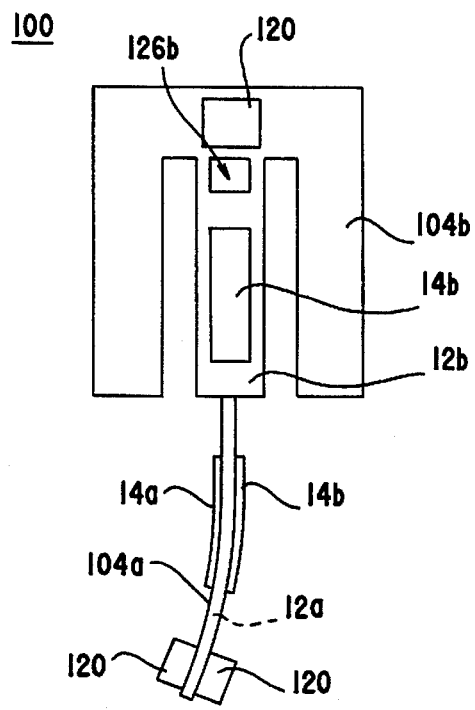
FIG. 42 is an illustrative view showing a state that acceleration is applied to an acceleration sensor shown in FIG. 37 in the direction perpendicular to the surface of the first vibrating body.

When acceleration is applied to, for example, the acceleration sensor 100 perpendicular to the surface of the first vibrating body 12a, the first vibrating body 12a bends in a direction perpendicular to its surface as shown in FIG. 42. In this time, since acceleration is applied to the second vibrating body 12b in a width direction, the second vibrating body 12b does not bend. Since one longitudinal end of the second vibrating body 12b is supported at both width ends with the second frame 104b, swing of the second vibrating body 12b is prevented as compared with the case, for example, of being supported at the center of the second vibrating body 12b. For preventing the swing of the second vibrating body 12b in a width direction, the whole end portion of the second vibrating body 12b may be supported with the second frame 104b. In this case, the hole 126b is not made.

Bending of the first vibrating body 12a interferes with the vibration of the first vibrating body 12a, and results in variation of the resonance characteristics. By measuring the variation of resonance characteristics, acceleration can be detected. In order to detect the acceleration, the voltages generated in the piezoelectric elements 14a, 14b are measured. The output voltages of the piezoelectric elements 14a, 14b are measured by the first differential circuit 112. When no acceleration is applied to the acceleration sensor 100, the same voltage having the same phase is generated in each piezoelectric element 14a, 14b. Hence, the output of the first differential circuit 112 becomes zero. When acceleration is applied to the acceleration sensor 100 and the first vibrating body 12a is bent, voltages having the inverse phase are generated in the opposed piezoelectric elements 14a, 14b. By measuring the difference between the output voltages of the opposed piezoelectric elements 14a, 14b, a high output voltage can be obtained from the first differential circuit 112. Therefore, the acceleration in the direction perpendicular to the surface of the first vibrating body 12a can be detected with a high sensitivity. The driving signal applied to the piezoelectric elements 14a, 14b is offset in the first differential circuit 112, the output signal from the first differential circuit 112 does not contain the driving signal.

Figure 43:
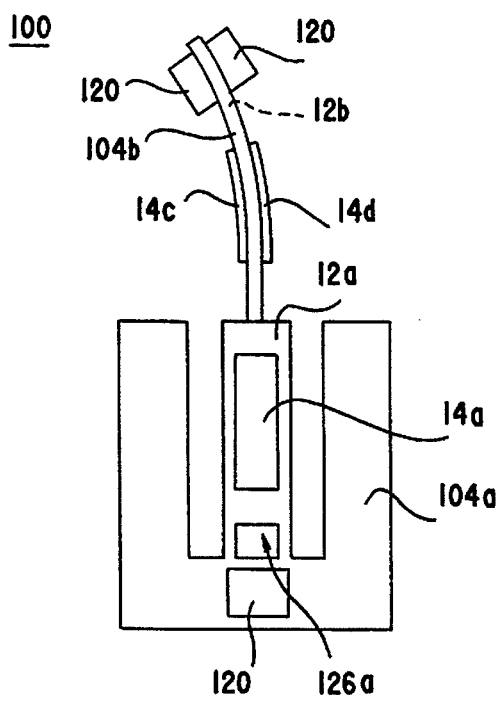
FIG. 43 is an illustrative view showing a state that acceleration is applied to an acceleration sensor shown in FIG. 37 in the direction perpendicular to the surface of the second vibrating body.

When acceleration is applied to, for example, the acceleration sensor 100 perpendicular to the surface of the second vibrating body 12b, the second vibrating body 12b bends in a direction perpendicular to its surface, as shown in FIG. 43. The acceleration can be detected by measuring the difference between the output voltages generated in the piezoelectric elements 14c, 14d. At this time, since acceleration is applied to the first vibrating body 12a in a width direction, one longitudinal end of the first vibrating body 12a is supported at both width ends with the first frame 104a for preventing the swing of the first vibrating body 12a due to the acceleration. Needless to say, the whole end portion of the first vibrating body 12a may be supported with the first frame 104a. In this case, the hole 126a is not formed.

When acceleration, which is not perpendicular to the surfaces of the first vibrating body 12a and the second vibrating body 12b, is applied to the acceleration sensor 100, the vibrating bodies 12a and 12b are deformed corresponding to the acceleration components perpendicular to the surfaces of the vibrating bodies 12a, 12b. Therefore, from the first differential circuit 112 and the second differential circuit 114, signals corresponding to the acceleration components perpendicular to the surfaces of the vibrating bodies 12a, 12b can be obtained. From these output signals, the acceleration in all directions perpendicular to the center axis of the first vibrating body 12a and the second vibrating body 12b can be detected.

In the acceleration sensor 100, since weights 120 are formed at the end portions of the vibrating bodies 12a, 12b, when the first vibrating body 12a or the second vibrating body 12b is bent, the bending is enlarged by the mass of the weights 120. Therefore, even when a minute acceleration is applied to the acceleration sensor, a large output signal can be obtained, and the acceleration sensor having high detection sensitivity can be obtained.

In the acceleration sensor 100, since vibrating bodies 12a, 12b are formed in a plate-shape, large bending from the acceleration can be obtained as compared with the vibrating body formed in a prism shape. Therefore, as compared with the acceleration sensor using a prism-shaped vibrating body, the large output signal from the acceleration can be obtained, and results in a high sensitivity.

Figure 44:
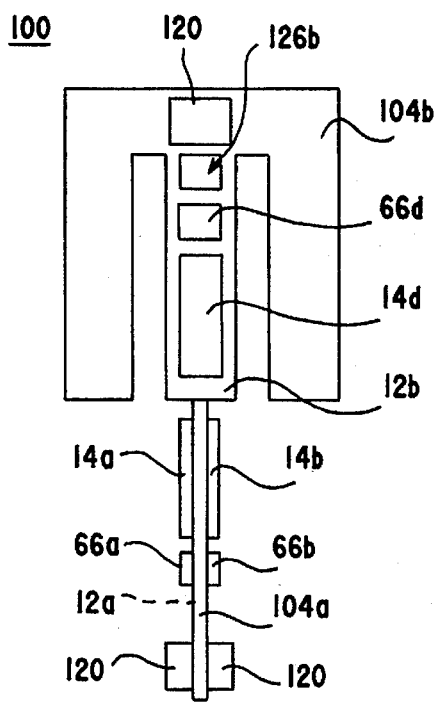
FIG. 44 is a front view showing a twelfth embodiment of an acceleration sensor of the invention.
Figure 45:
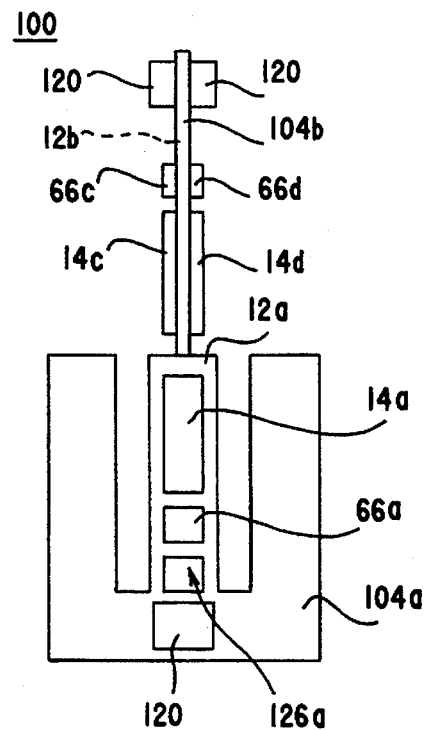
FIG. 45 is a side view showing an acceleration sensor shown in FIG. 44.

As shown in FIG. 44 and FIG. 45, it is possible to form other piezoelectric elements 66a, 66b and other piezoelectric elements 66c, 66d to the first vibrating body 12a and the second vibrating body 12b. The piezoelectric elements 14a, 14b and the piezoelectric elements 14c, 14d are used for driving, and the piezoelectric elements 66a, 66b and the piezoelectric elements 66c, 66d are used for detecting. In this case, by measuring the output voltages of the piezoelectric elements 66a, 66b and the piezoelectric elements 66c, 66d, the acceleration applied to the acceleration sensor 100 can be detected.

In such an acceleration sensor, it is possible to polarize all piezoelectric elements 14a–14d in the same direction. That is, the piezoelectric elements 14a, 14b, 14c, 14d may be polarized from the outside surface toward the vibrating body side, and the piezoelectric elements 14a, 14b, 14c, 14d may be polarized from the vibrating body side toward the outside surface. In such cases, the driving signals applied to the piezoelectric elements 14a, 14b and the driving signals applied to the piezoelectric elements 14c, 14d have inverse phases. In this way, the first vibrating body 12a and the second vibrating body 12b can be vibrated in such a manner that longitudinal expansion and contraction take place inversely.

Figure 46:
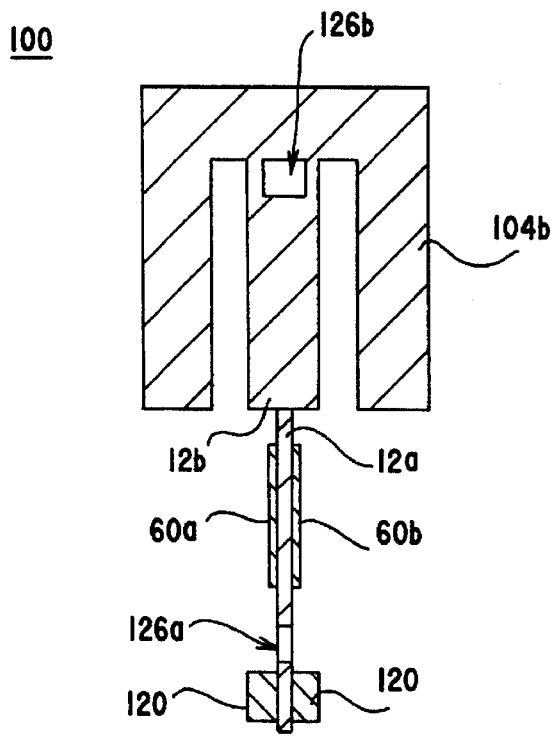
FIG. 46 is a sectional view showing a thirteenth embodiment of an acceleration sensor of the invention.
Figure 47:
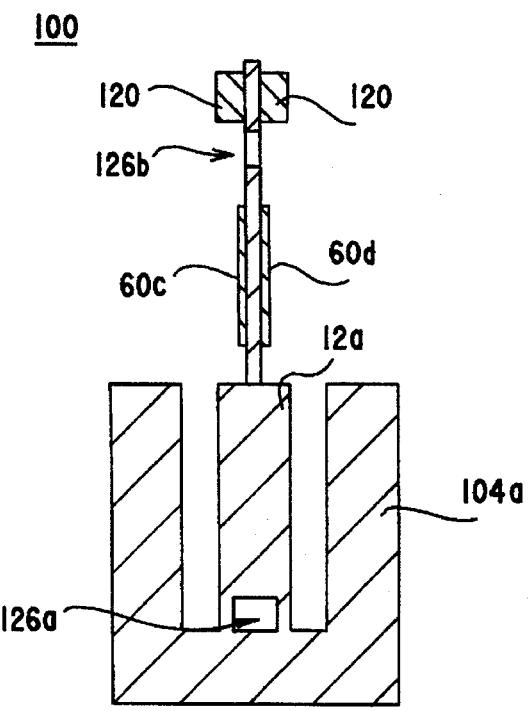
FIG. 47 is a sectional view showing an acceleration sensor shown in FIG. 46 which is cut across the other side.

As the material of the vibrating body 12a and 12b, piezoelectric ceramics may be used. In this case, as shown in FIG. 46 and FIG. 47, electrodes 60a, 60b, 60c, 60d are formed instead of the piezoelectric elements. The vibrating body 12a is polarized in a direction perpendicular to the electrodes 60a, 60b, and the vibrating body 12b is polarized in a direction perpendicular to the electrodes 60c, 60d. By applying the driving signals to the electrodes 60a, 60b and to the electrodes 60c, 60d, it is possible to vibrate the vibrating bodies 12a, 12b in such a manner that longitudinal expansion and contraction take place simultaneously. The phase of driving signals is decided by the polarizing direction of the vibrating body and connecting mode of the oscillation circuit. By measuring the output voltages of the electrodes 60a–60d, the acceleration can be detected. Similarly, as to the acceleration sensor having the shape as shown in FIG. 44 and FIG. 45, the vibrating bodies may be made of piezoelectric ceramics, and electrodes may be formed instead of the piezoelectric elements.

The vibrating body 12a and the vibrating body 12b may not be cross at a right angle with each other. If the surfaces of the vibrating bodies 12a, 12b are crossed with each other, it is possible to detect the acceleration components perpendicular to the surfaces, and the acceleration in all directions can be calculated from the acceleration components and the angle between the vibrating bodies 12a and 12b. The number of vibrating bodies is not always two, and more than three vibrating bodies may be connected on one center axis. In this case, if the direction of the surface of each vibrating body is made difference, the acceleration in a plurality of directions can be detected. Even in the case of the acceleration sensor using more than three vibrating bodies, it is possible to prevent vibration leakage to the frame by vibrating the vibrating bodies in such a manner that longitudinal expansion and contraction take place inversely at the both sides of the center of the connected vibrating bodies. The acceleration sensor having a high sensitivity can therefore be obtained.

Though the end portions of the vibrating bodies 12a, 12b are supported at both width ends with the frames 104a, 104b, the supporting method is not always limit to the method using the extending parts at both width ends of the vibrating bodies 12a, 12b in a longitudinal direction as shown in FIG. 37. For example, each of the vibrating bodies 12a, 12b may be supported with the frames 104a, 104b by extending diagonally from both width ends toward the frame. Each of the vibrating bodies 12a, 12b may be supported with the frames 104a, 104b by extending in a width direction of the vibrating body from both width ends toward the frame. Though the frames 104a, 104b are formed in parallel on both sides of the vibrating bodies 12a, 12b, they may be formed on one side of the vibrating bodies 12a, 12b.

FIG. 48 is a perspective view showing another embodiment of an acceleration sensor which can detect the acceleration in a plurality of directions, and FIG. 49 is its sectional view. An acceleration sensor 100 includes a rectangular plate-shaped first vibrating body 12a. At a longitudinal end of the first vibrating body 12a, a rectangular plate-shaped second vibrating body 12b is formed. The first vibrating body 12a and the second vibrating body 12b are arranged in a folded manner. The first vibrating body 12a and the second vibrating body 12b are connected at both width ends and at the center portion. Hence, two holes 130 are made side by side between the first vibrating body 12a and the second vibrating body 12b. The first vibrating body 12a and the second vibrating body 12b may be connected by, for example, welding or bonding. The first vibrating body 12a and the vibrating body 12b may be formed by stamping a metal plate and folding it at the center portion.

Piezoelectric elements 14a, 14b are formed on opposite surfaces of the first vibrating body 12a. Piezoelectric elements 14c, 14d are formed on opposite surfaces of the second vibrating body 12b. In the piezoelectric elements 14a–14d, for example, piezoelectric plates 16a, 16b are polarized from the outside surface toward the first vibrating body 12a side, and the piezoelectric plates 16c, 16d are polarized from the second vibrating body 12b side toward the outside surface.

The first vibrating body 12a is supported with a first frame 104a. The first frame 104a is formed in a U-shape, and the first vibrating body 12a is fixed to the center portion of the first frame 104a. A hole 126a is made at the connecting portion of first vibrating body 12a and the first frame 104a. Weights 120 are formed at the end side of the first vibrating body 12a.

Similarly, the second vibrating body 12b is supported with a second frame 104b. The second frame 104b is formed in a U-shape, and the second vibrating body 12b is fixed to the center portion of the second frame 104b. A hole 126b is made at the connecting portion of second vibrating body 12b and the second frame 104b. Weights 120 are formed at the end side of the second vibrating body 12b.

The first frame 104a and the second frame 104b are connected in a folded manner at a right angle with each other just like the first vibrating body 12a and the second vibrating body 12b. When the acceleration sensor 100 is used, the connecting portion between the first frame 104a and the second frame 104b is held.

When the acceleration sensor 100 is used, as shown in FIG. 50, an oscillation circuit 110 is connected to the piezoelectric elements 14a, 14b, 14c and 14d via the resistors 108a, 108b, 108c and 108d. The piezoelectric elements 14a and 14b are connected to a first differential circuit 112, and the piezoelectric elements 14c and 14d are connected to a second differential circuit 114.

Figure 51:
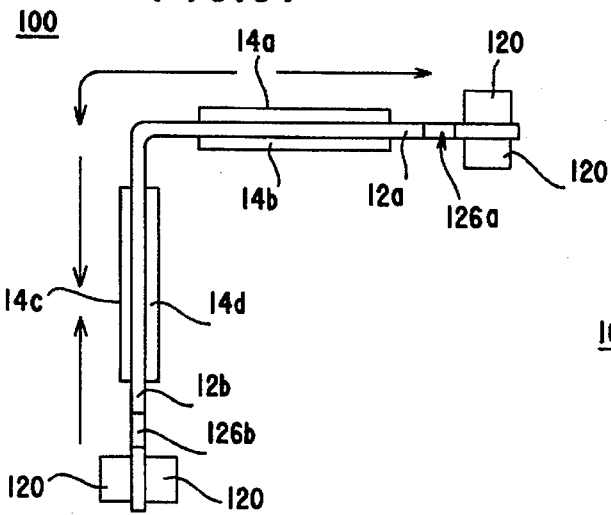
FIG. 51 is an illustrative view showing a vibrating state of an acceleration sensor shown in FIG. 48 at a given time.
Figure 52:
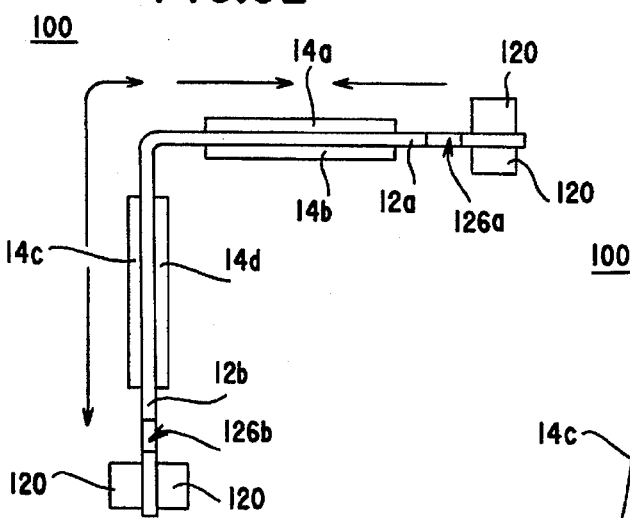
FIG. 52 is an illustrative view showing a vibrating state of an acceleration sensor shown in FIG. 48 at another given time.

When the acceleration sensor 100 is used, driving signals having a same phase are applied from the oscillation circuit 110 to the piezoelectric elements 14a, 14b, 14c and 14d. By the driving signals, as shown with the arrows in FIG. 51, when the first vibrating body 12a expands, the second vibrating body 12b contracts. As shown with the arrows in the FIG. 52, when the first vibrating body 12a contracts, the second vibrating body 12b expands. In this way, the first vibrating body 12a and the second vibrating body 12b vibrate in the longitudinal directions thereof. In this case, as shown with the arrows in FIG. 51 and FIG. 52, the vicinity of the connecting portion of the first vibrating body 12a and the second vibrating body 12b is displaced so as to fold and bend in the longitudinal directions of each vibrating body. Since the displacement of end portion of each vibrating body 12a, 12b is offset, and the end portion of each vibrating body 12a, 12b at the frame side is not displaced, this results in less vibration leakage to each frame 104a, 104b. Therefore, a stabilized vibration can be obtained.

Figure 53:
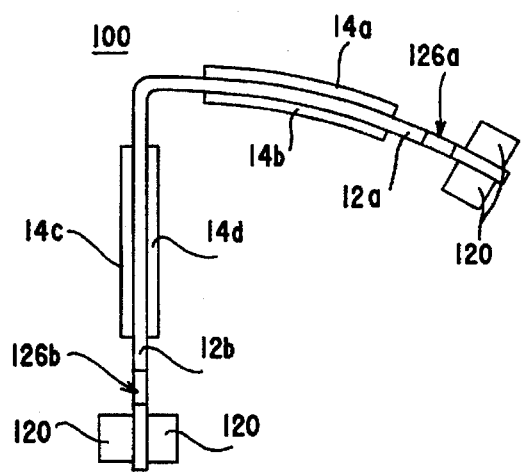
FIG. 53 is an illustrative view showing a state that acceleration is applied to an acceleration sensor shown in FIG. 48 in the direction perpendicular to the surface of the first vibrating body.

By vibrating the first vibrating body 12a and the second vibrating body 12b, inertia is applied to these vibrating bodies 12a and 12b. When an acceleration is applied to the acceleration sensor 100 in the direction perpendicular to the surface of the first vibrating body 12a under this condition, as shown in FIG. 53, the first vibrating body 12a bends in the direction perpendicular to its surface. In this case, since the acceleration is applied in the longitudinal direction of the second vibrating body 12b, the second vibrating body 12b does not bend. Since the second vibrating body 12b is supported at both width ends with the second frame 104b, swinging of the second vibrating body 12b in the width direction is prevented as compared with the case of being supported at the center of the second vibrating body 12b. Since the first vibrating body 12a and the second vibrating body 12b are connected at both width ends and at the center portions, as compared with a case of connecting at only the center portions, twisting at the connecting portions can be prevented. In order to prevent a width swing of the second vibrating body 12b, the whole end portions of the second vibrating body 12b may be supported with the second frame 104b. In this case, the hole 126b is not formed. Also, the connecting portion of the first vibrating body 12a and the second vibrating body 12b may be connected at the whole portion in the widthwise direction. In this case, the holes 130 are not formed.

Bending of the first vibrating body 12a interferes with the vibrating of the first vibrating body 12a, and results in a variation of the resonance characteristics. By measuring the variation of the resonance characteristics, the acceleration can be detected. In order to detect the acceleration, similarly to the acceleration sensor shown in FIG. 41, voltages generated in the piezoelectric elements 14a, 14b are measured by the first differential circuit 112.

Figure 54:
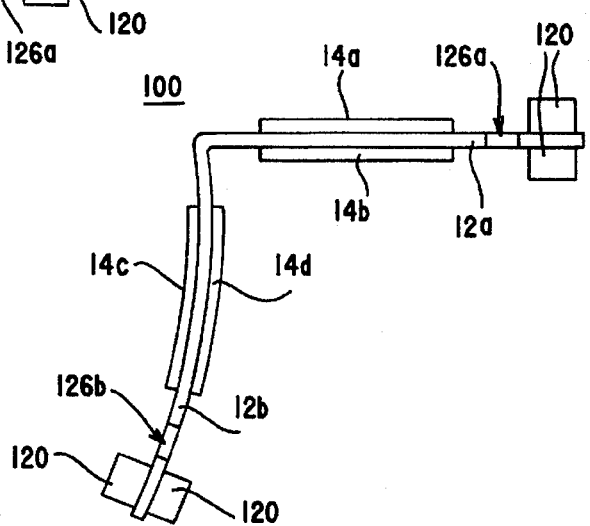
FIG. 54 is an illustrative view showing a state that acceleration is applied to an acceleration sensor shown in FIG. 48 in the direction perpendicular to the surface of the second vibrating body.

When an acceleration is applied to the acceleration sensor 100 in the direction perpendicular to the surface of the second vibrating body 12b, the second vibrating body 12b is bent as shown in FIG. 54. By measuring the difference between the output voltages generated in the piezoelectric elements 14c and 14d by the second differential circuit 114, the acceleration can be detected. In this case, in order to prevent swinging of the first vibrating body 12a, the first vibrating body 12a is supported with the first frame 104a at the both width ends. However the whole end portion of the first vibrating body 12a may be supported with the first frame 104a. In this case, the hole 126a is not made.

When acceleration, which is not perpendicular to the surfaces of the first vibrating body 12a and the second vibrating body 12b, is applied to the acceleration sensor 100, the vibrating bodies 12a and 12b are deformed corresponding to the acceleration components perpendicular to the surfaces of the vibrating bodies 12a, 12b. Therefore, from the first differential circuit 112 and the second differential circuit 114, signals corresponding to the acceleration components perpendicular to the surfaces of the vibrating bodies 12a, 12b can be obtained. From these output signals, the acceleration in all directions perpendicular to the connecting line of the first vibrating body 12a and the second vibrating body 12b.

In the acceleration sensor 100, since weights 120 are formed at the end portions of the vibrating bodies 12a, 12b, when the first vibrating body 12a or the second vibrating body 12b is bent, the bending is enlarged by the mass of the weights 120. Therefore, even when a minute acceleration is applied to the acceleration sensor, a large output signal can be obtained, and the acceleration sensor having high detection sensitivity can be obtained.

In the acceleration sensor 100, the vibrating bodies 12a, 12b are formed in a plate-shape, large bending against the acceleration can be obtained as compared with the vibrating body formed in a prism-shape. Therefore, as compared with the acceleration sensor using a prism-shaped vibrating body, a large output signal against the acceleration can be obtained, and results in a high sensitivity.

Figure 55:
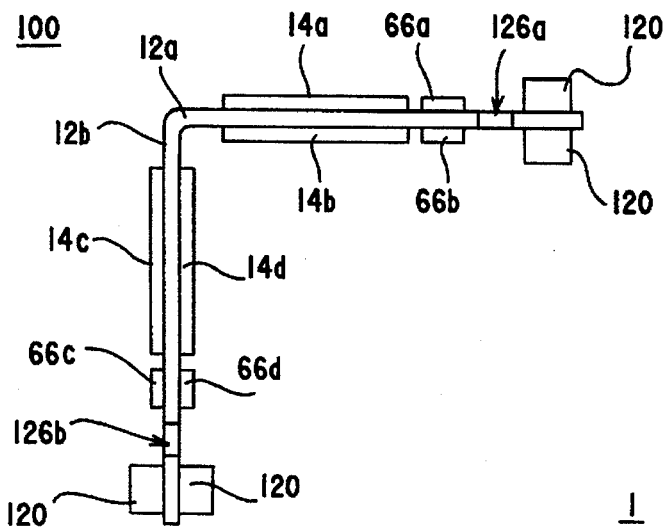
FIG. 55 is an illustrative view showing a fifteenth embodiment of an acceleration sensor of the invention.
Figure 57:
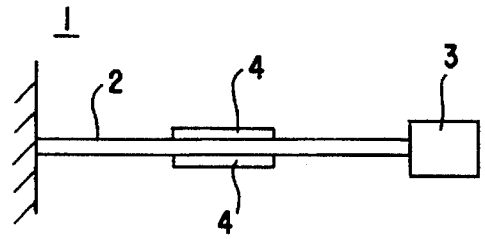
FIG. 57 is a illustrative view showing an example of a conventional acceleration sensor which is a background of the invention.

As shown in FIG. 55, it is possible to form other piezoelectric elements 66a, 66b and other piezoelectric elements 66c, 66d to the first vibrating body 12a and the second vibrating body 12b. The piezoelectric elements 14a, 14b and the piezoelectric elements 14c, 14d are used for driving, and the piezoelectric elements 66a, 66b and the piezoelectric elements 66c, 66d are used for detecting. In this case, by measuring the output voltages of the piezoelectric elements 66a, 66b and the piezoelectric elements 66c, 66d, the acceleration applied to the acceleration sensor 100 can be detected.

In such an acceleration sensor 100, it is possible to polarize all piezoelectric elements 14a–14d in the same direction. That is, the piezoelectric elements 14a, 14b, 14c, 14d may be polarized from the outside surface toward the vibrating body side, and the piezoelectric elements 14a, 14b, 14c, 14d may be polarized from the vibrating body side toward the outside surface. In such cases, the driving signals applied to the piezoelectric elements 14a, 14b and the driving signals applied to the piezoelectric elements 14c, 14d have inverse phase. In this way, the first vibrating body 12a and the second vibrating body 12b can be vibrated in such a manner that longitudinal expansion and contraction take place inversely.

Figure 56:
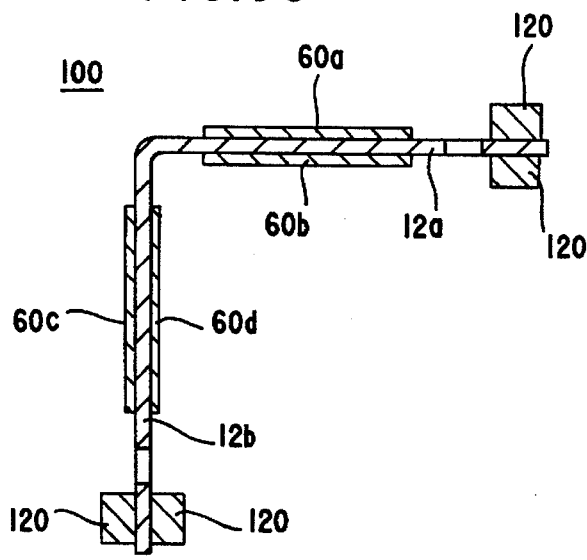
FIG. 56 is a sectional view showing a sixteenth embodiment of an acceleration sensor of the invention.
Figure 58:
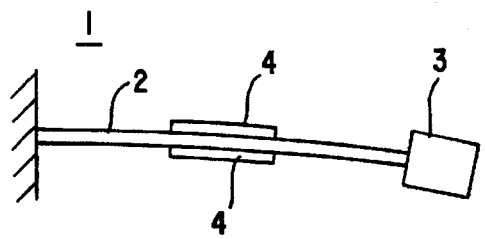
FIG. 58 is an illustrative view showing a state that acceleration is given to an acceleration sensor shown in FIG. 57.

As the material of the vibrating body 12a and 12b, piezoelectric ceramics may be used. In this case, as shown in FIG. 56, electrodes 60a, 60b, 60c, 60d are formed instead of the piezoelectric elements 14a–14d. The vibrating body 12a is polarized in a direction perpendicular to the electrodes 60a, 60b, and the vibrating body 12b is polarized in a direction perpendicular to the electrodes 60c, 60d. By applying the driving signals to the electrodes 60a, 60b, and to the electrodes 60c, 60d, it is possible to vibrate the vibrating bodies 12a, 12b in such a manner that longitudinal expansion and contraction take place simultaneously. The phase of the driving signals is decided by the polarizing direction of the vibrating body and connecting mode of the oscillation circuit. By measuring the output voltages of the electrodes 60a–60d, the acceleration can be detected.

Similarly, as to the acceleration sensor having the shape as shown in FIG. 55, the vibrating bodies may be made of piezoelectric ceramics, and electrodes may be formed instead of the piezoelectric elements.

The vibrating body 12a and the vibrating body 12b may not be cross at a right angle with each other. If the the vibrating bodies 12a, 12b are connected with each other in a folded manner, it is possible to detect the acceleration components perpendicular to the surfaces, and the acceleration in all directions can be calculated from the acceleration components and the angle between the vibrating bodies 12a and 12b.

While the present invention has been particularly described and shown, it is to be understood that such description is used merely as an illustration and example rather than limitation, and the spirit and scope of the present inventions are determined solely by the terms of the appended claims.

What is claimed is:

1. An acceleration sensor comprising:
   a plurality of plate-shaped vibrating bodies made of piezoelectric material connected in a folded manner; and
   electrodes formed on surfaces of said vibrating bodies, wherein
   said vibrating bodies vibrate in such a manner that longitudinal expansion and contraction take place inversely at both sides a folding portion of said vibrating bodies by applying a driving signal to said electrodes.

2. An acceleration sensor according to claim 1, wherein two said vibrating bodies are connected in a folded manner at a right angle, and a pair of said electrodes are formed on opposite surfaces of each of said vibrating bodies.

3. An acceleration sensor according to claim 1 which further comprises frames connected with each other for supporting said vibrating bodies.

4. An acceleration sensor according to claim 2, wherein each of said vibrating bodies is polarized in an direction perpendicular to said electrodes.

5. An acceleration sensor according to claim 3, wherein each of said vibrating bodies is polarized in an direction perpendicular to said electrodes.

6. An acceleration sensor according to claim 2, wherein driving signals having inverse phase are applied to two said pairs of said electrodes on said vibrating bodies.

7. An acceleration sensor according to claim 3, wherein driving signals having inverse phase are applied to two pairs of said electrodes on said vibrating bodies.

* * * * *